United States Patent
Mikuriya et al.

(10) Patent No.: US 7,119,517 B2
(45) Date of Patent: Oct. 10, 2006

(54) METHOD FOR RECYCLING SECONDARY BATTERY

(75) Inventors: Hitoshi Mikuriya, Kanagawa (JP); Kenichi Aoki, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 309 days.

(21) Appl. No.: 10/473,323

(22) PCT Filed: Jan. 30, 2003

(86) PCT No.: PCT/JP03/00878

§ 371 (c)(1),
(2), (4) Date: Sep. 29, 2003

(87) PCT Pub. No.: WO03/069715

PCT Pub. Date: Aug. 21, 2003

(65) Prior Publication Data
US 2004/0113588 A1    Jun. 17, 2004

(30) Foreign Application Priority Data
Feb. 12, 2002    (JP)    ............................. 2002-033670

(51) Int. Cl.
*H02J 7/00*    (2006.01)
*G06F 7/08*    (2006.01)
*G06F 17/00*    (2006.01)
*H04M 1/00*    (2006.01)

(52) U.S. Cl. ...................... 320/109; 235/381; 700/231; 379/143

(58) Field of Classification Search ................ 320/109; 235/381; 700/231; 379/91.02, 143
See application file for complete search history.

(56) References Cited

U.S. PATENT DOCUMENTS

| 5,164,761 | A | * | 11/1992 | Isono et al. | ................. 396/279 |
| 5,352,270 | A | * | 10/1994 | Shackle | ....................... 75/419 |
| 5,694,019 | A | * | 12/1997 | Uchida et al. | ............... 320/106 |
| 6,514,311 | B1 | * | 2/2003 | Lin et al. | ...................... 75/424 |
| 6,526,361 | B1 | * | 2/2003 | Jones et al. | ................... 702/63 |
| 6,618,644 | B1 | * | 9/2003 | Bean | .......................... 700/231 |
| 6,822,422 | B1 | * | 11/2004 | Sagawa | ..................... 320/109 |
| 6,940,254 | B1 | * | 9/2005 | Nagamine et al. | .......... 320/109 |

FOREIGN PATENT DOCUMENTS

| DE | EP-905810 | * | 3/1999 |
| JP | 61-501289 | | 6/1986 |
| JP | 1-173289 | | 7/1989 |
| JP | 3-41594 | | 2/1991 |
| JP | 8-222274 | | 8/1996 |
| JP | 9-35760 | | 2/1997 |

(Continued)

*Primary Examiner*—Pia Tibbits
(74) *Attorney, Agent, or Firm*—Wenderoth, Lind & Ponack, L.L.P.

(57) ABSTRACT

A method features the steps of determining whether a secondary battery collected from a user is reusable when being handed over again to the user after being recharged, by performing a simple inspection on a site where the battery is received and returned to the user. The battery is transferred to another site for additional detailed inspection to further examine whether the battery is reusable when the determination is such that quality up to the specified capacity is not assured if the battery is given back for further usage to the user only after recharging it. The processes described in the above method can ensure the user that the battery has a reusable quality to the specified capacity, while the battery can be given back quickly.

32 Claims, 16 Drawing Sheets

FOREIGN PATENT DOCUMENTS

| | | | |
|---|---|---|---|
| JP | 10-293874 | | 11/1998 |
| JP | 410293345 | * | 11/1998 |
| JP | 11-150809 | | 6/1999 |
| JP | 2000-90348 | | 3/2000 |
| JP | 2001-23037 | | 1/2001 |
| JP | 2001229889 | * | 8/2001 |
| JP | 2001-283931 | | 10/2001 |
| WO | 85/03790 | | 8/1985 |

* cited by examiner

| Number | Location | Prescribed ratio |
|---|---|---|
| 51 | Positive terminal | 1% |
| 52 | External surface | 10% |
| 53 | Negative terminal | 5% |

User management table

| User identifier | Number of new purchases | Number of reuses |
|---|---|---|
| A0001 | 1 | 10 |
| A0002 | 2 | 52 |
| ⋮ | ⋮ | ⋮ |
| F0001 | 1 | 0 |

FIG. 21

Secondary battery management table

Repeat "n" times

| Battery Identifier | Date of Manu- facture | First-time user identifier | Number of reuses | First inspection data | First reuse data | Second inspection data | Second reuse data |
|---|---|---|---|---|---|---|---|
| 1100001 | h13.10.1 | A0001 | 5 | ----- | ----- | ----- | ----- |
| 1100002 | h13.10.2 | A0002 | 3 | ----- | ----- | ----- | ----- |
| ⋮ | ⋮ | ⋮ | ⋮ | ⋮ | ⋮ | ⋮ | ⋮ |

FIG. 22

| User identifier | Battery identifier | Kind of information | Information |
|---|---|---|---|

METHOD FOR RECYCLING SECONDARY BATTERY

TECHNICAL FIELD

The present invention relates to a method of recycling reusable secondary batteries by receiving and returning them to users.

BACKGROUND ART

With the advancement of a variety of portable apparatuses in recent years, many batteries are used widely in light of convenience in portability and general versatility, such as AA-type alkaline storage batteries (type LR6), and the like.

On the other hand, small secondary batteries like rechargeable nickel metal hydride storage batteries, and lithium ion secondary batteries are expanding their market rapidly, including applications in the fields of cellular phones, laptop computers, video cameras, and the like.

Alkaline dry batteries are readily available and easily usable. However, they are high in running cost, and heavy in environmental load, because they are disposed of when completely discharged in headphone stereos and digital cameras, for instance.

On the other hand, although the secondary batteries are superior in cost performance including their running cost, they are not quite popular because of such reasons as high initial cost, time to recharge which requires fully-charged spare batteries ready to use in case of replacement, high price of battery charger, and so forth.

In addition, even though the secondary batteries consume a smaller amount of natural resources than the primary batteries because they can be recharged many times for repeated use, a ratio of their reclamation is only about 10% at the most since collection of those once-sold secondary batteries is dependent only upon goodwill of the individual users.

Because of the above reasons, there were proposed a number of ideas, such as recharging collected secondary batteries and reselling them as second-hand goods, renting secondary batteries to the users with collateral recharge service, and the like.

Japanese Patent Unexamined Publications, (1) H03-41594, (2) 2001-283931, (3) S61-501289, (4) H01-173289, (5) H10-293874, (6) H11-150809, (7) 2000-90348, and (8) 2001-23037 are some examples of the ideas (these publications are referred to as prior art examples 1 through 8).

The prior art example 1 discloses a vending machine used to sell second-hand secondary batteries that are collected and classified according to their levels of quality. However, the vending machine provided on a site where secondary batteries are exchanged with users (may also be referred to as "location") needs to be a large scale piece of equipment, if the batteries are classified properly according to their levels in addition to the reuse process such as recharging. Furthermore, the recycle rate would likely lower a significant amount, if the vending machine executes at the site only a simple process of inspection and revitalization for reuse.

In addition, secondary batteries applicable to this vending machine are limited to small sealed lead-acid batteries as described in this prior art example 1, since they are the only batteries, capacities of which can be determined based on open-circuit voltages and internal impedance. Thus, the invention is not applicable to nickel metal hydride batteries and lithium rechargeable batteries which have been mainly used in recent years.

Moreover, although the prior art example 1 makes reference to recovery of resources by recycling, an anticipated rate of recovery would be considerably low in reality, since collection of used batteries depends solely upon goodwill of the users once they were sold to them, as described above.

On the other hand, prior art example 2 discloses a method of providing exchange services, in which discharged secondary batteries used by users are replaced with fully-charged secondary batteries.

However, the disclosed method takes some time to complete, and it does not provide prompt service, because it requires time to execute placement of a tag for controlling the history of each secondary battery in addition to recharging it at a site where batteries are brought in and exchanged with those of users.

In addition, since degradation of the secondary batteries varies according to conditions of use by individual users, it is not possible to assure quality of the batteries when being used by the users, if they are controlled simply by time and number of usages. It also makes the recycling difficult when all secondary batteries that have exceeded certain usable periods are discarded automatically, since this leads to disposal of the unusable batteries without separating them into groups each with the same kind of batteries.

In other words, none of the above examples provides a sound method of assuring quality of the secondary batteries easily on the site where the secondary batteries are exchanged with those of users.

SUMMARY OF THE INVENTION

The present invention is derived in view of the above, with an object of providing a method of receiving and replacing secondary batteries in serviceable condition with users while assuring their quality in a simple manner, thereby promoting repeated use and recycling of the secondary batteries.

To achieve the above object, the method comprises the steps of determining whether a secondary battery collected from a user is reusable when being handed over again to the user after being recharged, by performing a simple inspection at a site where the battery is received and returned to the user, and by transferring the battery to another site for additional detailed inspection to further examine whether the battery is reusable when the determination is such that quality up to the specified capacity is not assured if the battery is given back for further usage to the user only after recharging it.

The processes described in the above method can ensure the user that it has a reusable quality to the specified capacity, while the battery can be given back quickly.

BRIEF DESCRIPTION OF THE DRAWINGS

FIG. 21 is a management table for secondary batteries according to the fourth exemplary embodiment; and FIG. 22 is a map showing a structure of data transmitted to the server unit according to the fourth exemplary embodiment.

DETAILED DESCRIPTION OF THE INVENTION

Referring to the accompanying drawings, a description will be provided hereinafter of methods of recycling secondary batteries according to the preferred embodiments. Like reference marks are used throughout this document for structural components and steps having like functions and like operations, and details may be omitted from one place to another.

First Exemplary Embodiment

Figure 1:
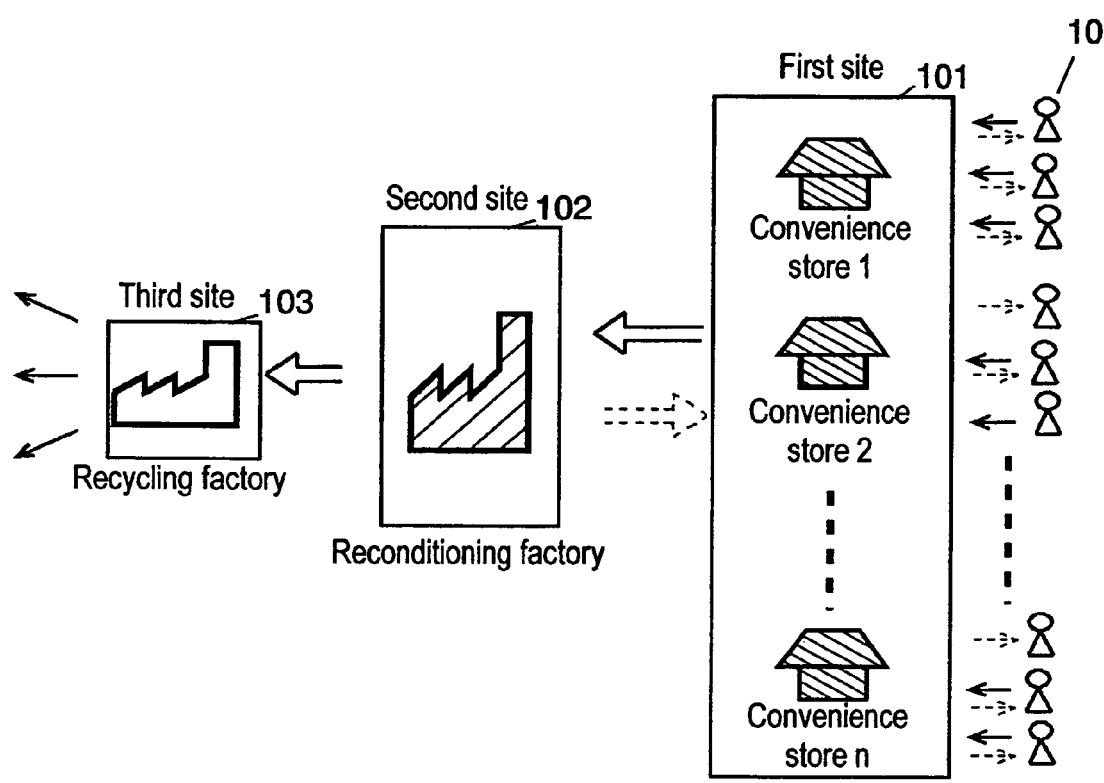
FIG. 1 is a conceptual diagram showing a system which achieves a method of recycling secondary batteries according to a first exemplary embodiment.

FIG. 1 is a conceptual diagram showing a system of achieving a method of recycling secondary batteries in this invention. FIG. 1 shows first sites 101, a second site 102, and a third site 103.

The first site 101 is a location for receiving used secondary batteries (i.e., discharged secondary batteries) from users 10 of the secondary batteries (hereinafter referred to as "user" when appropriate), and for handing over to the users secondary batteries that have been processed for revitalization such as recharging. Each arrow with a solid line indicates reception of a battery from a user 10, and each arrow with a dotted line indicates handing the battery over to the user 10. The secondary battery being handed over to the user need not necessarily be the same battery received from the user. The first site 101 means any of such stores as convenience stores, shops in railroad stations and similar locations situated throughout the country, as concrete examples. There are generally a large number of first sites 101.

In first site 101, a predetermined inspection is performed to classify received batteries into at least two groups of different levels, including those in a first group that can be handed over to the user as they are, and those in a second group that need to be forwarded to a second site 102. Processes are then carried out according to the quality levels (e.g., OK or No Good) of the individual groups. One of the processings is to make the batteries reusable, details of which will be described with reference to FIG. 2.

In the second site 102, the secondary batteries transferred from the first site 101 are received, and a predetermined inspection is again performed to classify the batteries into at least two groups of different levels, those in a first group that are returned to the first site 101, and the others in another group that need to be forwarded to a third site. Next, those secondary batteries having a certain level of quality and therefore to be returned to the first site 101 are subjected to a predetermined reuse process. To be more specific, the second site 102 includes a reconditioning factory for the secondary batteries.

The third site 103 receives the secondary batteries that are not reusable from second site 102, and they are put into a recycling process. The third site 103 includes a recycling factory, to be more specific.

What has been described above is the system of accomplishing the method of recycling the secondary batteries according to this invention.

Figure 2:
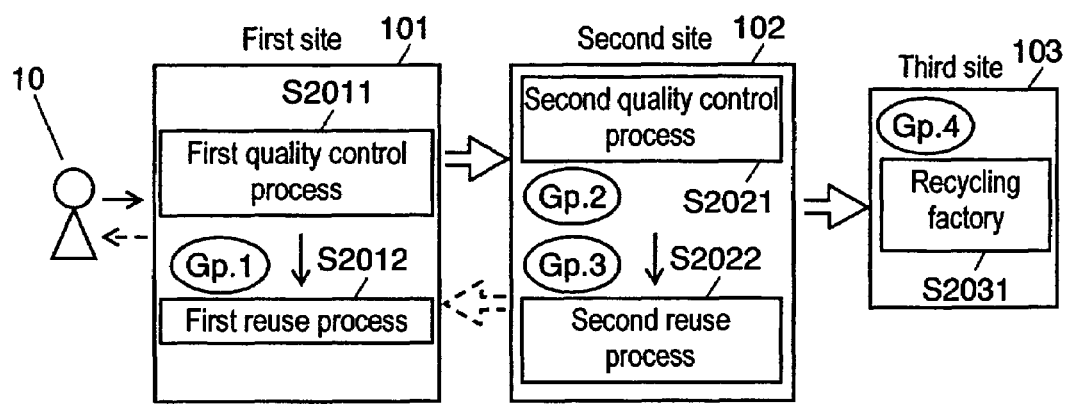
FIG. 2 is a diagram showing in detail the system of achieving the method of recycling secondary batteries according to the first exemplary embodiment.

The processes to be carried out in the first site 101, the second site 102, and the third site 103 are now described by referring to a flowchart of FIG. 2.

The process performed in first site 101 is described first.

Step S2011: A first inspection is performed on secondary batteries received from a user, and these secondary batteries are separated into two or more groups of different quality levels based on a result of the first inspection. This step is called a first quality control process, and the batteries are separated here into a first group (Gp.1) to be transferred to a first reuse process and a second group (Gp.2) transferred to a second quality control process. The first inspection may include two or more different kinds of examinations.

Step S2012: The secondary batteries separated into one or more levels and belonging to Gp.1 are subjected to a first reuse processing which consists of different processes according to the classified levels, to make them reusable. Thus, the process is called the first reuse process. The first reuse process may include two or more different kinds of processing for revitalization.

The next description pertains to the process performed in second site 102.

Step S2021: The secondary batteries separated into at least one level that belongs to Gp.2 are subjected to a second inspection, and these secondary batteries are again separated into two or more groups of different levels based on a result of the second inspection. This step is called a second quality control process, and the batteries are separated here into a third group (Gp.3) to be transferred to a second reuse process and a fourth group (Gp.4) transferred to a recycling factory. The second inspection may include two or more different kinds of examinations.

Step S2022: The secondary batteries separated into one or more levels among those belonging to Gp.3 are subjected to a second reuse process which consists of different processes according to the classified levels, to make them reusable. This process is thus called the second reuse process. Processes as to how the revitalization is carried out on the secondary batteries of each level are determined beforehand. The second reuse process may include two or more different kinds of processing for revitalization.

The next description pertains to a process performed in the third site 103.

Step S2031: The secondary batteries separated into one or more levels that belong to Gp.4 and not subjected to the second reuse process as a result of the separation in the second quality control process are disassembled to collect useful materials. This process is called a recycling process.

Described above is the basic flow of reusing the secondary batteries.

It is desirable that the first quality control process to be carried out in the first site 101 is a comparatively simple inspection as compared to that of the second quality control process performed in second site 102. The simple inspection means an inspection that requires inexpensive equipment to perform the inspection, and requires a short time and few man-hours to carry out the inspection.

In addition, it is also desirable that the first reuse process to be carried out in first site 101 is a comparatively simple process as compared to the second reuse process performed in the second site 102. The simple process means a process that requires inexpensive equipment, short time, and few man-hours to complete the processing.

The first site 101 is considered to be any of such places as convenience stores, shops in railroad stations and the like situated throughout the country, and the inspection and reuse process carried out in the first site 101 thus needs to be simple using inexpensive equipment. It is also desirable that the inspection and reuse process carried out in first site 101 can be completed in a short time. On the other hand, second site 102 may be established in just one or a few locations to cover the whole country, and performs difficult tasks of the inspection and the reuse process.

A description is provided hereinafter of specific details about the first inspection, the second inspection, the first reuse process, and the second reuse process by referring to FIG. 3.

First, a used battery is brought into a site by a user. The site means the first site 101, which can be one of many convenience stores located throughout the country, for example.

Next, identification is made of the battery. The identification of the battery is a process of determining whether it is one of the secondary batteries that are the subject of this method of recycling according to the present invention. If the recycling process is intended only for secondary batteries of certain manufacturers, for instance, any secondary batteries made by other manufacturers are rejected as "NG" (i.e., not good) as a result of the identification, and it is returned to the user. This identification can be made by means of image processing of the exterior view of the battery, or by reading a barcode or a data recorded in a rewritable memory sheet placed on the exterior of the battery. A method of identifying the battery will be described in detail in the subsequent exemplary embodiment. The identification of the battery is not limited to identifying the manufacturer. Such secondary batteries that are the subject of the recycling process of this invention may be provided individually with a barcode or a rewritable memory sheet having information recorded as to whether it is one of the pre-selected applicable secondary batteries. This facilitates the identification of the battery by simply reading the information.

Performed next is an open-circuit voltage check as one item of the first inspection (inspection 1-1). The open-circuit voltage check is a process of measuring a value of open-circuit voltage and separating the secondary battery into any of two or more groups of different quality levels according to the voltage value. If the secondary battery is an AA-size nickel metal hydride battery, as a specific example, it is judged "Good" in quality level if it has an open-circuit voltage in a range of 1.0V and 1.4V and an internal resistance in a range of 10 m$\Omega$ and 40 m$\Omega$, but it is judged "NG" if any of the values is outside of the above ranges. In FIG. 2, Gp.1 corresponds to the level of "Good", and Gp.2 the level of "NG".

Next, a secondary battery classified into the quality level of "Good" as a result of the above open-circuit voltage check is put to a predetermined recharging process according to the quality level of each individual secondary battery. This recharging process is one of the steps in the above-mentioned first reuse process. The first reuse process may include only one, two, or more kinds of processing steps, however.

A secondary battery, if classified to be at the level of "NG" as a result of the open-circuit voltage check, is transferred to the second site for processing. A concrete example of the process performed in the second site will be described in detail in the later paragraph.

The secondary battery classified as being at the level of "Good" (Gp.1) as a result of the above open-circuit voltage check is put to the recharging process, as described already. The recharged secondary battery can be handed over to the user. However, it is preferable to carry out the following inspection before it is handed over. This inspection is a closed-circuit voltage check (inspection 1-2) for measuring a value of closed-circuit voltage. It is desirable to complete the inspection and the recycling process in the first site 101 only when a result of this closed-circuit voltage check satisfies a prescribed condition. In the case of a AA-size nickel metal hydride battery, the prescribed condition to be satisfied with is a minimum voltage value of 1.10V (or higher) when the closed-circuit voltage is measured for a duration of 0.5 second in a circuit of 0.3$\Omega$ resistance. Any secondary battery that can meet the above requirement is considered to satisfy the needs of the user.

Figure 3:
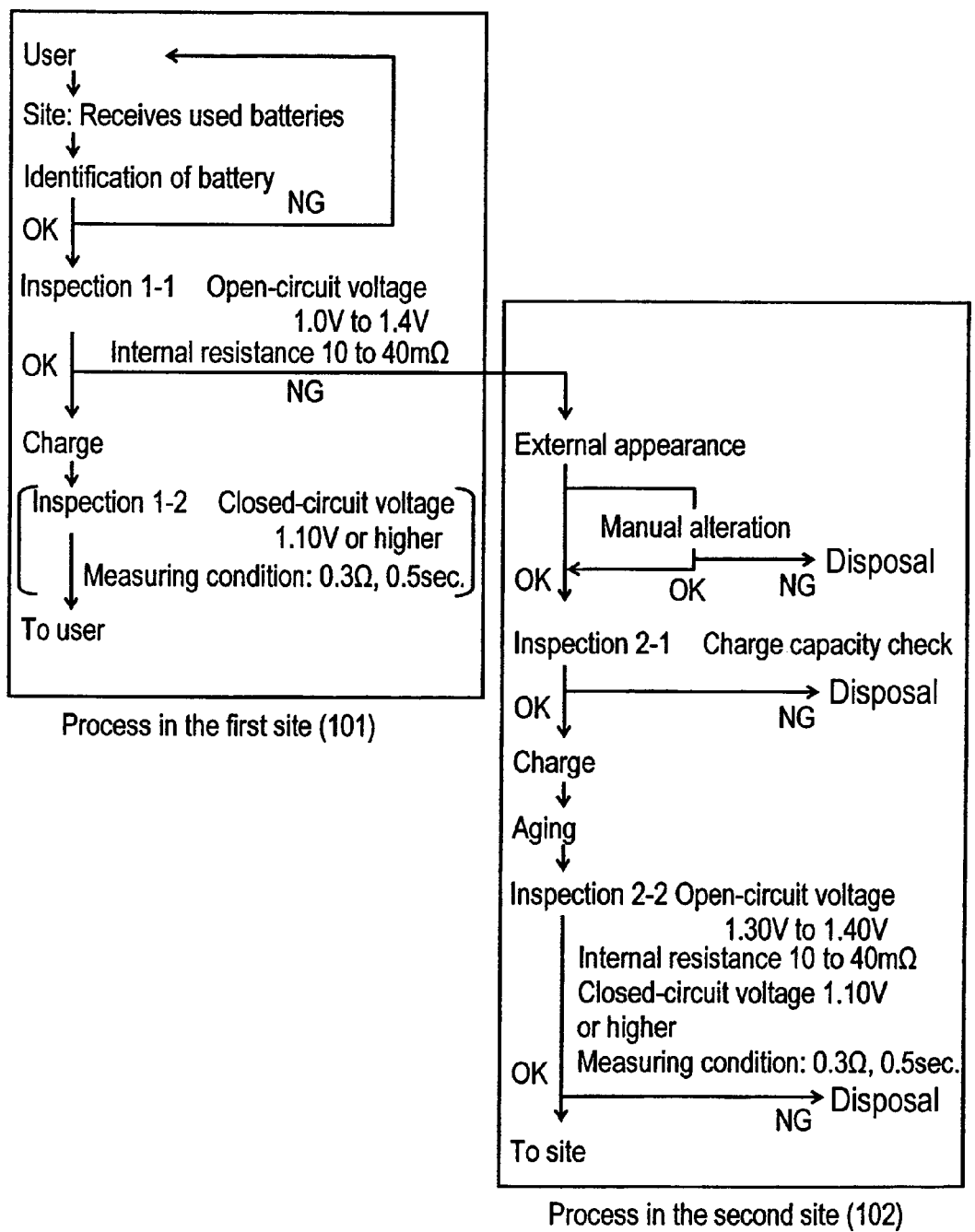
FIG. 3 is a diagram showing a flow of processes in the method of recycling secondary batteries according to the first exemplary embodiment.
Figure 4:
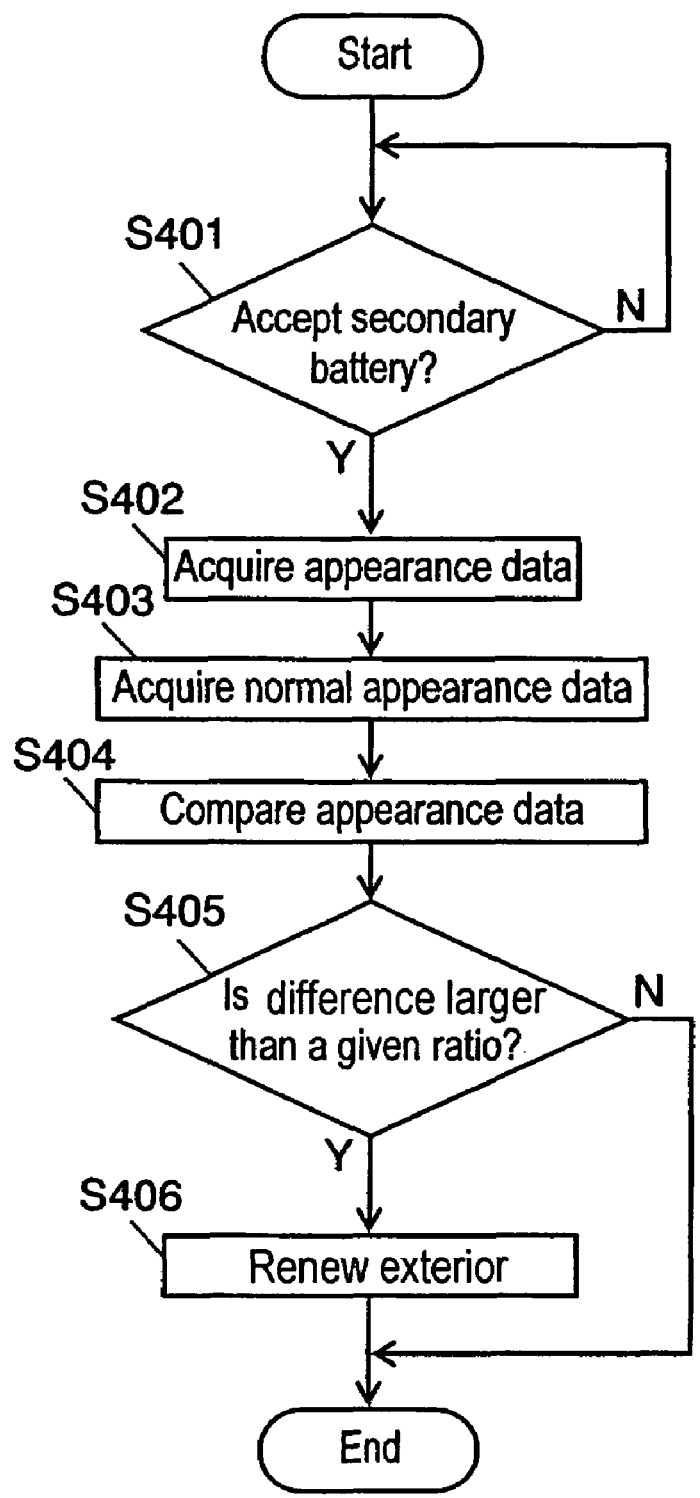
FIG. 4 is a flowchart showing processes of visual inspection by means of image processing according to the first exemplary embodiment.

A description is now provided of the process carried out in the second site 102, with reference to FIG. 3 and FIG. 4.

First, those secondary batteries that are classified in (Gp.2) as having the level of "NG" in the inspection and processing in first site 101 are delivered to the second site 102.

The received secondary batteries are placed under a visual inspection. The visual inspection is to check the secondary batteries for stains, scratches and similar damages. The visual inspection includes the following methods.

A first visual inspection is performed to check an external appearance by means of image processing. This inspection using image processing is described by referring to a flow-chart of FIG. 4.

Step S401: A determination is made as to whether a device for the visual inspection, not shown here, has accepted a secondary battery. The process proceeds to step S402 if the determination is that the device has accepted a secondary battery, or the process goes back to the step S401 if a battery is not accepted.

Step S402: Appearance data covering information on the external appearance of the accepted secondary battery is then produced. The appearance data includes such information as an external view of the secondary battery taken by a camera, scanner and the like, for example. It is desirable that this appearance data covers pictures taken from a plurality of directions rather than just one view taken from one direction.

Step S403: A normal appearance data is retrieved from data stored beforehand in the device for carrying out the visual inspection.

Step S404: A comparison is made between the appearance data produced in step S402 with the normal appearance data retrieved in step S403.

Step S405: A determination is then made as to whether a difference between the two sets of data is equal to or larger than a predetermined ratio as a result of the comparison in step S404. If it is equal to or larger than the predetermined ratio, the process goes on to step S406, or the process ends if it is smaller than the predetermined ratio. This ratio can be set to any value deemed appropriate. For instance, any secondary battery having scratches, etc. over 10% or more of its area is sent to step S406. Subsequently, the secondary battery can be delivered after the exterior surface (i.e., the external appearance) having scratches is renewed.

Step S406: The exterior is renewed. Renewal of the exterior includes such a process as, for example, stripping an old exterior cover off the secondary battery and placing a new exterior cover on the battery. This process of renewing the exterior is one of the processes made in the second reuse process.

Figures 5, 6:
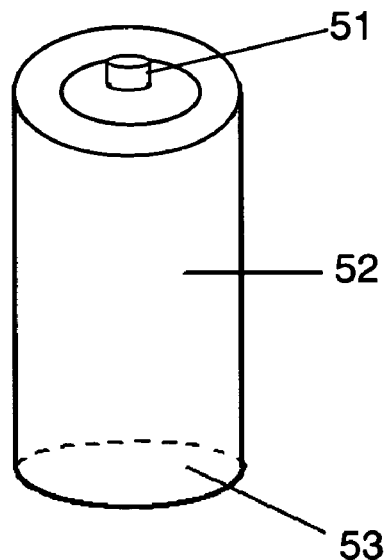
FIG. 5 is an external view of a secondary battery.
FIG. 6 is a management table showing information relating to classification levels in the visual inspection according to the first exemplary embodiment.

In the visual inspection performed by image processing, it is desirable to thoroughly check the exterior around positive terminal 51 of the secondary battery shown in FIG. 5. The reason is that any swelling or deformation present in this area, even small in size, prevents the battery from being reused. Therefore, if the secondary battery has any swelling or deformation in the vicinity of positive terminal 51, it is put into "disposal" in FIG. 3. The secondary battery separated into the group of "disposal" may be transferred to the recycling process.

The predetermined ratio used for screening the secondary batteries may be set differently from one area to another. In other words, there are different values of predetermined ratios for positive terminal 51, exterior surface 52 and negative terminal portion 53 of the secondary battery as indicated in a table shown in FIG. 6. A battery is grouped into the level of "NG" if a result of the visual inspection is any of 1% or larger in the vicinity of positive terminal 51, 10% or larger in exterior surface 52 and 5% or larger in negative terminal portion 53.

Figure 7:
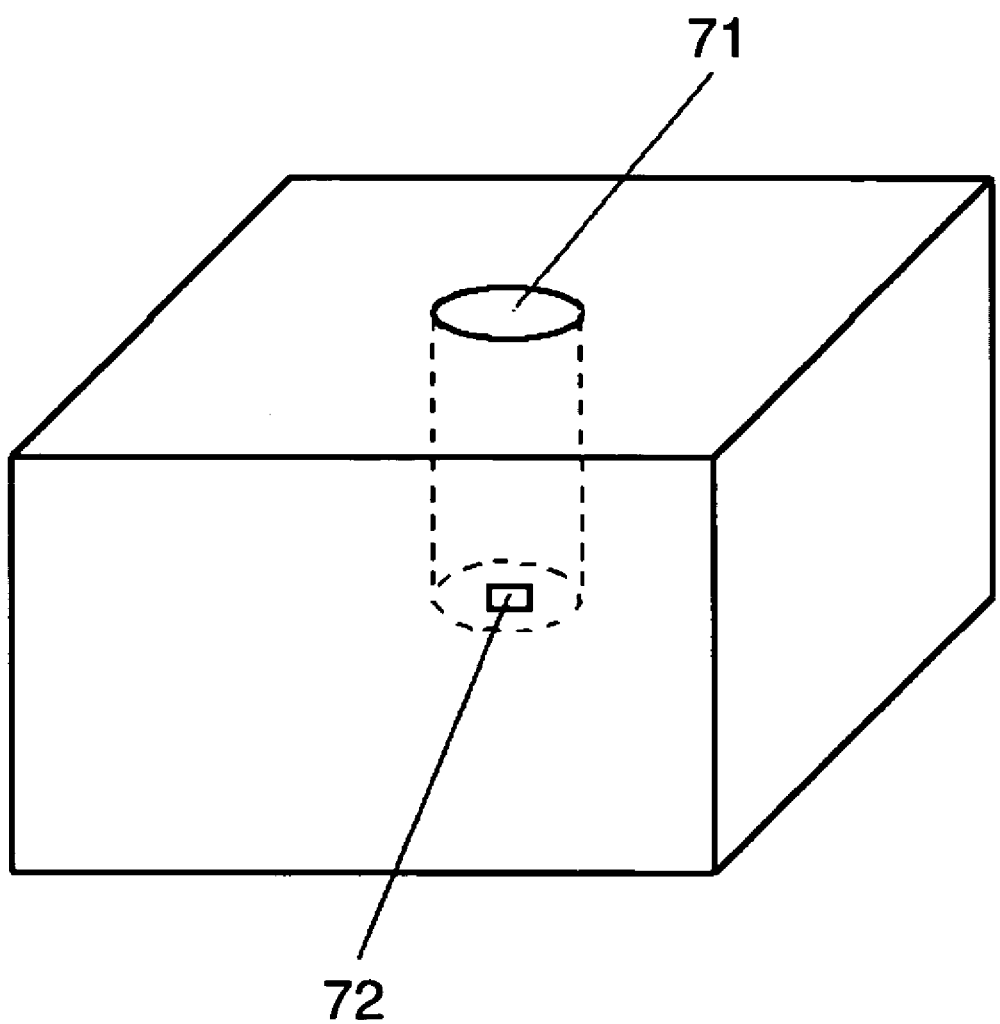
FIG. 7 is a perspective view showing a box used for the visual inspection according to the first exemplary embodiment.

A second visual inspection is a method to mechanically check for swelling, scratches and similar defects of the secondary battery with a simple visual inspection tool. The tool shown in FIG. 7 has a hole of similar shape to the battery (a cylindrical shape in this case). The second visual inspection is a method of placing the secondary battery into insertion opening 71, and determining automatically that the battery has swelling or the like if it does not fit in the hole. The determination can be made easily as to whether the secondary batteries is inserted, by using pressure sensor 72 provided at the bottom of the hole. Further details are not given here, since such method is a well-known technique.

All of the secondary batteries classified as being at the level of "Good" as a result of the visual inspection and those given the process of exterior renewal are subjected to an electrical charge capacity inspection (i.e. inspection 2-1), and separated into two or more groups. The electrical charge capacity inspection is an inspection to examine an electrical charge and discharge capacity of the secondary batteries, and it includes the following inspections as specific examples.

In the case of an AA-size nickel metal hydride storage battery of 1600 mAh in the rated capacity (commercially available AA-type battery), the electrical charge and discharge check is made in the following steps.

First, the battery is charged for 12 hours with an electric current of 160 mA (this is called a 120% charge of the rated capacity).

Next, the battery is discharged with an electric current of 320 mA until a terminal voltage (i.e. the voltage measured with a voltmeter across a positive terminal and a negative terminal) of the battery drops down to 1.0V.

A capacity of the battery is calculated as 320 mA×5 hours to obtain 1600 mAh, if it takes 5 hours to drop the voltage to 1.0V.

The battery is classified into the group of "Good" if the battery capacity calculated above satisfies the rated capacity or a given level of capacity (i.e. quality-guaranteed capacity). Or, the battery is classified as "NG" if it does not meet any of the criteria.

Any of the secondary batteries classified "Good" as a result of the above electrical charge capacity inspection are then put to a charging process. It is normal to provide the batteries with an aging period after the charging process. This process is also one of the steps in the second reuse process described above.

On the other hand, the other secondary batteries of which results of the above electrical charge capacity inspection are classified as "NG" are put to a disposing process or a recycling process. The recycling process is to disassemble the secondary batteries, and to collect useful materials for recycling.

Those secondary batteries that have been charged and gone through the aging period are examined again for the open-circuit voltage check and the closed-circuit voltage check. The secondary batteries are separated into two or more groups of different levels based on results of the open-circuit voltage check and the closed-circuit voltage check. The open-circuit voltage check and the closed-circuit voltage check fall under the second inspection (inspection 2-2) shown in FIG. 3. In the case of a AA-size nickel metal hydride storage battery, for example, it can be classified "Good" if an open-circuit voltage is within a range of 1.30V and 1.40V, and an internal resistance is in a range of 10 mΩ and 40 mΩ.

In measuring a closed-circuit voltage in the second inspection, it is desirable that a resistance of 0.3Ω and a measuring time of 0.5 seconds are used as the measurement conditions in the case of a AA-size nickel metal hydride storage battery, for example. Under the above conditions, it is desirable to classify any battery as "Good" when it has a closed-circuit voltage value of 1.10V or higher.

If results of the open-circuit voltage check and the closed-circuit voltage check are preferable, or judged "Good", the secondary battery is returned to the first site 101. Otherwise, it is put to the disposing process or the recycling process described above if judged "NG".

The description given above is the basic flow of the method of recycling secondary batteries in this exemplary embodiment. According to this exemplary embodiment, a simple inspection and simple revitalizing process are carried out in the first site 101, and all secondary batteries not properly processable in the first site 101 are transferred to the second site 102. A relatively complicated inspection and reuse process are then performed in the second site 102. By establishing the inspection and the reuse processes in two stages, this embodiment can thereby substantially increase a recycling rate of the secondary batteries and promote realization of the recycle-oriented society of secondary batteries. Adoption of this recycling method of the invention can thus remarkably contribute to solving the environmental problems.

In addition, since the secondary batteries not processable in the second site 102 are brought to the third site 103 for the recycling process, this further improves effective use of the resources.

In this exemplary embodiment, although the plurality of inspections and the plurality of recycling processes have been described as being carried out in the first site 101 and the second site 102, all of these processes need not be completed in the two sites. Instead, only some of the inspections and the processes described above may be done selectively when appropriate.

Moreover, although the visual inspection has been described in this exemplary embodiment as being carried out in the second site, a process of examining the exterior may be executed in the first site. In this case, the secondary batteries classified as "NG" as a result of the visual inspection are normally transferred to the second site 102 for renewal of the exterior finish.

Furthermore, it is desirable in this exemplary embodiment that the secondary batteries are recharged complementally before they are handed over to users, if a certain time has passed after they went through the reuse process. To determine the elapsed time, an identification label may be placed on a surface of each battery or above a wrapping after it is recharged. The user can purchase the fully recharged secondary batteries trustfully, by confirming a date of the recharge which is printed in characters or otherwise marked otherwise in the identification labels placed on them. In addition, a form of wrapping the batteries can be changed in a manner so that the users can easily determine whether the batteries are unused at the time of purchase. There are a number of ways to achieve this object, including a method of wrapping the entire battery, wrapping a part of the battery or affixing a seal in a manner to insulate one of positive and negative terminals of the battery. If batteries are wrapped in this manner so that they cannot be used unless the wrapping or the seals are removed, the user can easily determine that the batteries are not used.

Moreover, the second quality control process in this exemplary embodiment may include additional inspections for a short-circuit or similar defect. The inspection for a short-circuit is performed to determine whether the secondary battery has any internal defect such as a short-circuit or a partial short-circuit, and whether the secondary battery maintains a predetermined capacity.

While there are many types of secondary batteries such as lead acid batteries, nickel cadmium batteries, nickel metal hydride batteries, lithium secondary batteries, and the like, this recycling method of the invention is applicable to any of these secondary batteries.

Among these listed above, the nickel metal hydride batteries are the most suitable secondary batteries for this recycling method of the invention, since they have superior characteristics such as being very safe and not being likely to deteriorate easily in the discharge capacity even after repeated use through as many as 500 charging and discharging cycles under the normal use condition.

Second Exemplary Embodiment

A description is provided in this exemplary embodiment of the case which includes an authentication process of users. Inspections for quality control and reuse processes are performed in the manner described in the first exemplary embodiment.

In this exemplary embodiment, a system is designed so that only registered users (may be referred to as a user) can use a method of reusing secondary batteries described in this document of the invention. User authentication is a process of determining that a user is registered. This process of user authentication is carried out prior to the quality control process and the reuse process described above.

Figure 8:
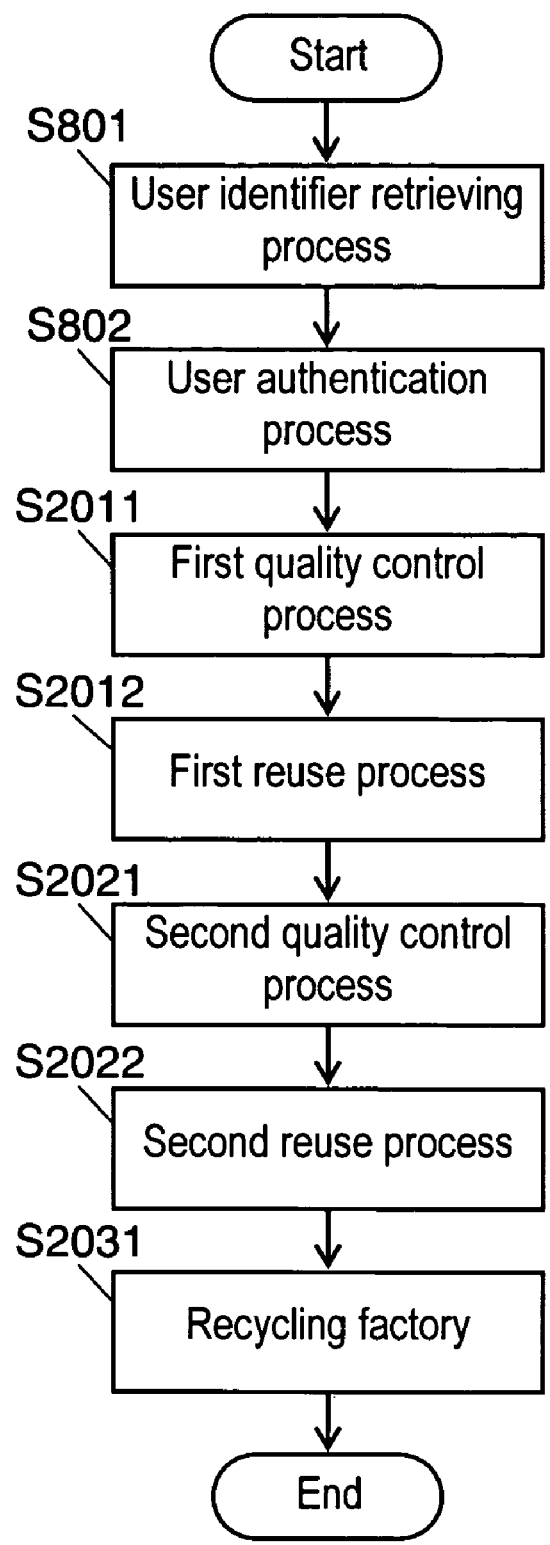
FIG. 8 is a flowchart showing a method of recycling processes according to a second exemplary embodiment.

Referring to a flowchart of FIG. 8, a description is given below of a relation among the user authentication process, the quality control process and the reuse process.

Step S801: A user identifier for identifying a user is retrieved. This step is called a user identifier retrieving process.

Step S802: Determination is made as to whether the user is legitimate as identified by the retrieved user identifier.

Step S2011: A first quality control process is performed.

Step S2012: A first reuse process is performed.

Step S2021: A second quality control process is performed.

Step S2022: A second reuse process is performed.

Step S2031: A recycling process is performed.

A description is provided hereinafter of the user identifier retrieving process and the user authentication process in detail using a flowchart shown in FIG. 9.

Step S901: Determination is made as to whether there is an input of a user identifier. The process goes on to step S902 if there is an input, or goes back to step S901 if there is no input. The user identifier may be such data as a series of characters, a barcode, and the like. Input of the user identifier can be made using a variety of means such as entry through a keyboard, reading a barcode with a barcode reader, reading the user identifier recorded in an IC card, reading the user identifier recorded on a memory sheet placed on the exterior of the secondary battery, and the like.

Step S902: The user identifier is acquired.

Step S903: Using the user identifier as a key, a user management database prepared beforehand is searched. The user management database may be designed so as to store user identifiers individually, or certain conditions corresponding to users.

Step S904: A determination is made on a result of the search as to whether the user is legitimate. If the user is legitimate, the process proceeds to step S905, or proceeds to step S906 if the user is not. The user is determined legitimate if the user management database has stored a user identifier that matches with the user identifier input to it, or if a condition stored therein corresponds to the user identifier input to it.

Step S905: A series of inspection and reuse processes are carried out from step S2011 to step S2031 as shown in FIG. 8.

Step S906: An error process is performed. The error process means any of a process of providing an error message, a process of preventing a battery from being inserted into the box shown in FIG. 7, and a process of rejecting the inserted battery as it is to be returned to the user.

In the second exemplary embodiment, details have been given above of the user authentication process. By executing the user authentication, this exemplary embodiment allows a party promoting this business to carry out the method of recycling secondary batteries under it own control, thereby helping it to further promote recycling of the secondary batteries, and to contribute to the environment protection.

The process of user authentication in this second exemplary embodiment is carried out mainly as a part of the method of recycling the secondary batteries described in the first exemplary embodiment.

Third Exemplary Embodiment

A description is provided of the third exemplary embodiment which includes a process of battery verification using battery identification data. The battery verification means a process of identifying batteries to be reused or recycled according to the recycling method described above, so as to exclude any batteries that are not subject to this process. Inspections for quality control and reuse process are performed in a manner similar to that described in the first exemplary embodiment.

Figure 10:
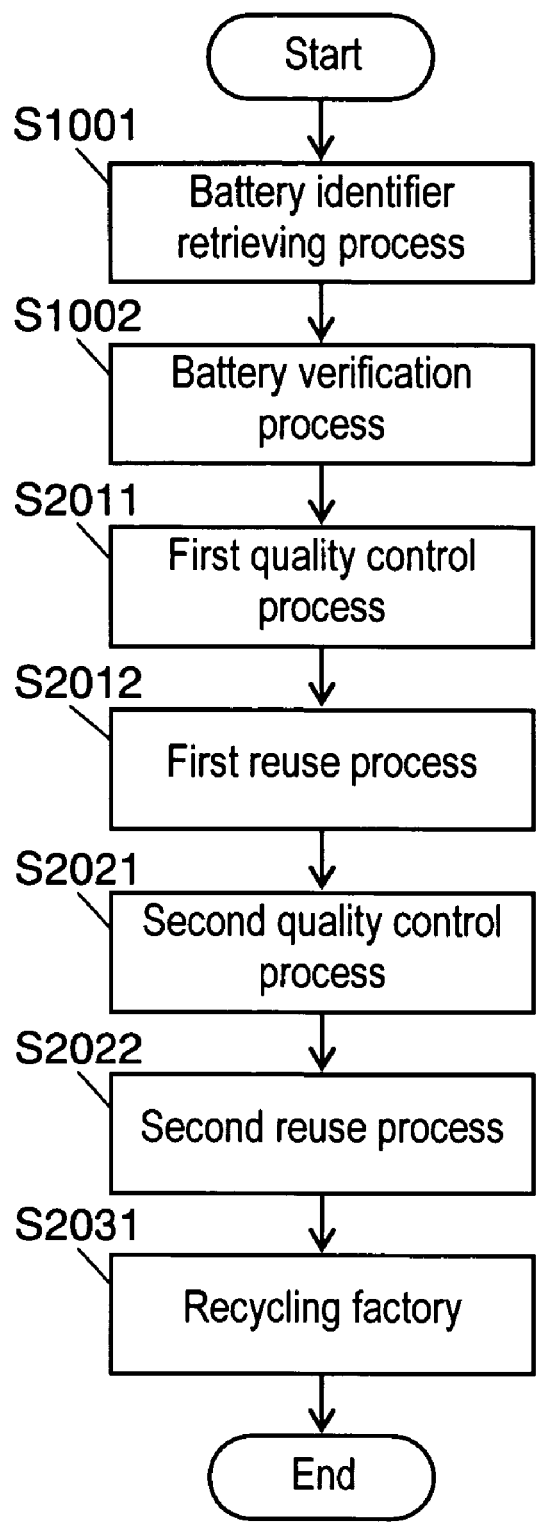
FIG. 10 is a flowchart showing a method of recycling processes according to a third exemplary embodiment.

Referring to a flowchart of FIG. 10, description is given hereinafter of a relation among the battery verification process, the quality control process and the reuse process.

Step S1001: A secondary battery identifier for identifying a secondary battery is retrieved. This step is called a battery identifier retrieving process.

Step S1002: A determination is made as to whether the secondary battery identified by the retrieved secondary battery identifier is suitable for reuse. This step is called a battery verification process.

Step S2011: A first quality control process is performed.
Step S2012: A first reuse process is performed.
Step S2021: A second quality control process is performed.
Step S2022: A second reuse process is performed.
Step S2031: A recycling process is performed.

A description is provided hereinafter of the battery identifier retrieving process and the battery verification process in detail using a flowchart shown in FIG. 11.

Step S1101: A determination is made as to whether a secondary battery identifier is received. The process goes on to step S1102 if a secondary battery identifier is received, or goes back to a point preceding step S1101 if a secondary battery identifier is not received. The secondary battery identifier can be of any data so long as it can identify a type of the secondary batteries. The secondary battery identifier can be of any such data that can identify the secondary batteries individually, a name of a manufacturer or a distributor of the secondary batteries, and/or a date of manufacture of the secondary batteries.

The secondary battery identifier can be of any form such as a series of characters, barcode, image data, and the like. Input of the secondary battery identifier can be made using a variety of means such as entry through a keyboard, reading a barcode with a barcode reader, reading the secondary battery identifier recorded in an IC card, reading the secondary battery identifier recorded on a memory sheet placed on the exterior of the secondary battery, and the like.

Step S1102: The secondary battery identifier is retrieved.

Step S1103: A determination is made as to whether the secondary battery is suitable for recharging/reuse based on the retrieved secondary battery identifier. The process goes on to step S1104 if it is suitable, or the process proceeds to step S1105 if it is not suitable. The secondary battery is suitable if it is one of the objects to be processed using this method of recycling according to this invention.

Step S1104: A series of inspection and reuse processes are carried out from step S2011 to step S2031 as shown in FIG. 10.

Step S1105: An error process is carried out. The error process means any of a process of providing an error message, a process of preventing a battery from being inserted into the box shown in FIG. 7, and a process of rejecting the inserted battery as it is to be returned to the user.

A description given above is the operating steps of the battery verification process. A concrete example of the battery verification is described hereinafter.

Figure 12:
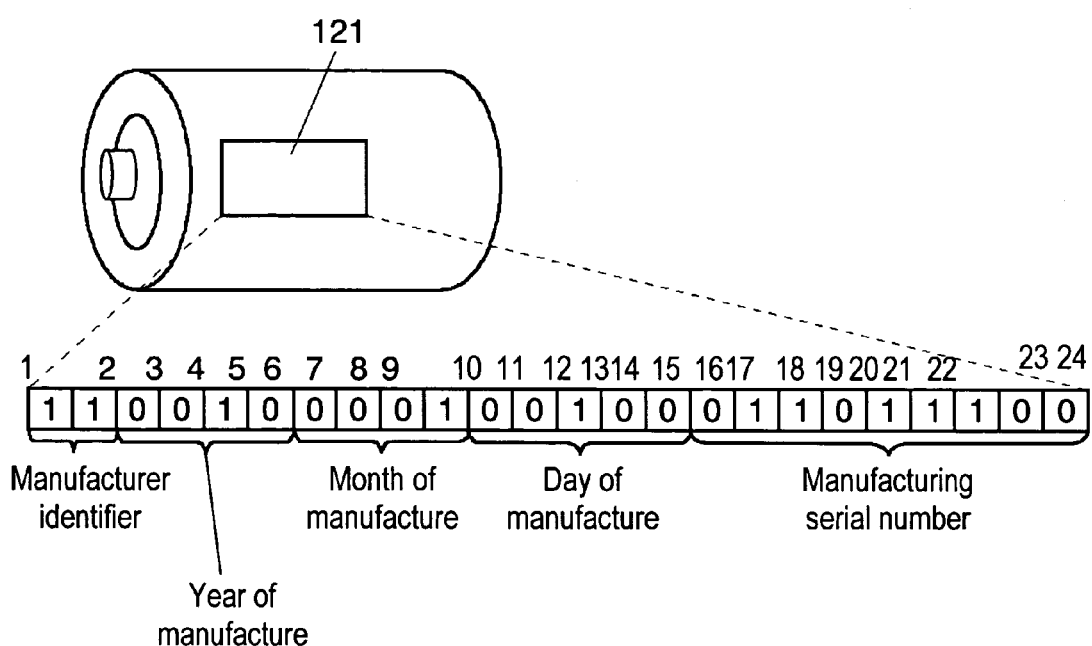
FIG. 12 is a perspective view showing a secondary battery bearing a rewritable memory sheet according to the third exemplary embodiment.

Assume that there is a secondary battery here as shown in FIG. 12. This secondary battery is provided with rewritable memory sheet 121 affixed thereto. This memory sheet 121 has 24 bits of data, in which two higher bits 1 and 2 represent a manufacturer identifier for identification of the manufacturer, and the following four bits 3 to 6 represent a data indicating year of manufacture of the battery. Digits "0010" indicate the year 2,002, as an example of identifying manufacturing year. In this example, digits in these four bits can identify any year from 2,000 to 2,015.

The next four bits 7 to 10 show the month of manufacture. It represents January in this example because the digits are "0001". The next five bits 11 to 15 indicate the day of manufacture. In this example, it is the fourth day because they are "00100". In other words, the date of manufacture of this example is Jan. 4, 2002.

Finally, the following nine bits 16 to 24 represent a manufacturing serial number at the date of manufacture. Original identification of the secondary battery can be made as described by using the date of manufacture and the manufacturing serial number.

The next description pertains to the battery verification when the above data are recorded in memory sheet 121 of the secondary battery. A determination is made first as to whether there is a memory sheet affixed to it when making verification, and a battery is considered not suitable if it does not bear a memory sheet. This is because any battery without a memory sheet is treated as not suitable for reuse.

In addition, the manufacturer identifier is examined, and the battery is determined not suitable if it is not one of the batteries made by any of preregistered manufacturers. The purpose of this is to enable the system to handle only batteries made by certain manufacturers as reusable batteries.

Furthermore, the date of manufacture is examined, and the battery is determined not suitable if it is manufactured before a specified date. The purpose of this is to exclude old batteries from a flow of the reuse process.

Moreover, the manufacturing serial number is also used for a determination that only secondary batteries having manufacturing serial numbers larger than a predetermined number are suitable. This is for the reason that a predetermined number of batteries are put on sale in the regular channel, and all other secondary batteries manufactured in excess of the predetermined number are used for the business through the process of this recycling method.

In the third exemplary embodiment, the method of recycling secondary batteries using the secondary battery identifier was described as above. Since this puts only the suitable secondary batteries into the flow of this recycling method, it can establish a system of reusing the suitable batteries.

In the third exemplary embodiment, although the determination is made directly from the secondary battery identifier to verify that the battery is suitable, the same determination may be made by contacting a center computer via a network or the like by referring to the secondary battery identifier. In this case, the center computer is designed to store in advance such information as manufacturer identifiers, dates of manufacture, history of use as well as history of reuse processes, as will be described in a fourth exemplary embodiment, in a manner corresponding to the individual secondary battery identifiers.

Furthermore, this third exemplary embodiment may be provided additionally with the process of user authentication using a user identifier described in the second exemplary embodiment.

In addition, the user identifier may also be included into the secondary battery identifier.

In this third exemplary embodiment, although what has been described is a variety of ways of verifying the secondary batteries (i.e. data and process used for the verification), this invention is not restricted to those described. Memory sheet 121 used herein may be made of a heat-sensitive rewritable card or similar material which can be written in with a thermal head or a thermal laser, for instance.

Alternatively, a heat-sensitive rewritable card may be designed and used in such a manner that it has printed data including characters, symbols, and other markings used as a conventional label, beside a certain area for recording additional information required as the memory sheet described above. Use of the label in this way can omit extra labels on batteries.

In addition, a recharge date may be recorded by printing it with character data in a portion of the heat-sensitive rewritable card. The user can thus purchase the fully recharged secondary batteries trustfully, by confirming the date of recharge.

Fourth Exemplary Embodiment

In the fourth exemplary embodiment, a description is provided of a system of managing information relating to inspections, reuse processes and the like performed in a first quality control process, a first reuse process, a second quality control process, a second reuse process, and a recycling process.

Figure 13:
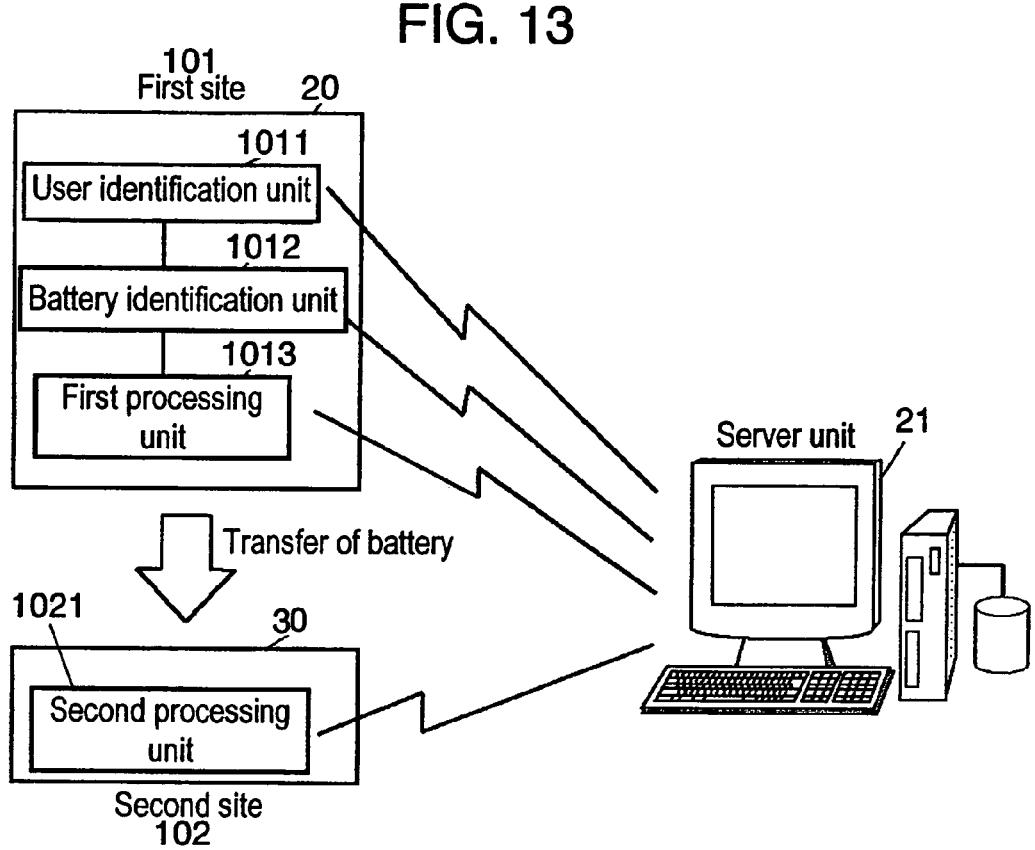
FIG. 13 is a conceptual diagram of an information management system for managing recycling process data and the like according to a fourth exemplary embodiment.

FIG. 13 shows a conceptual architecture of an information management system for managing information on the inspections and the reuse processes and the like.

The information management system comprises user identification unit 1011, battery identification unit 1012, first processing unit 1013, second processing unit 1021 and server unit 21.

User identification unit 1011, battery identification unit 1012 and first processing unit 1013 are normally located in a first apparatus 20 at the first site 101. Second processing unit 1021 is normally located in a second apparatus 30 at the second site 102.

The user identification unit 1011, battery identification unit 1012, first processing unit 1013, and second processing unit 1021 are connected to a network with a cable or wireless means so as to communicate data with server unit 21. However, communication between user identification unit 1011, etc. and server unit 21 need not be limited only to the network, so long as the data are exchangeable. In other words, the communication can be achieved by broadcasting means such as ground wave and satellite, CATV, and the like.

The user identification unit 1011 carries out a process of user authentication as described in the second exemplary embodiment. For instance, it reads a user identifier from an IC card, and makes an inquiry about the legitimacy of the user from server unit 21.

Battery identification unit 1012 carries out the verification process of secondary batteries as described in the third exemplary embodiment. For example, it reads data on exterior view of a secondary battery with a scanner or the like, obtains a manufacturer name of the secondary battery, and determines whether the battery identified by the manufacturer name is one of the covered objects to be processed in the subsequent step.

There is also the following process as another example. Battery identification unit 1012 obtains a secondary battery identifier recorded in a memory sheet affixed to a secondary battery, and acquires a variety of information on the secondary battery from server unit 21 using the secondary battery identifier as a key. The subsequent inspection processes and reuse processes may vary depending on the obtained information.

The first processing unit 1013 is a device to achieve the first quality control process (S2011) and the first reuse process (S2012) described in the first exemplary embodiment. Details of the first processing unit 1013 will be described below.

Second processing unit 1021 is a device to achieve the second quality control process (S2021) and the second reuse process (S2022) also described in the first exemplary embodiment. Details of the second processing unit 1021 will be described below.

Server unit 21 receives and stores results of the variety of inspections and information of the reuse processes carried out on the secondary battery identified by the user identifier and the secondary battery identifier. Details will also be described below.

Each of the above units is described hereinafter in the sequential order.

Figure 14:
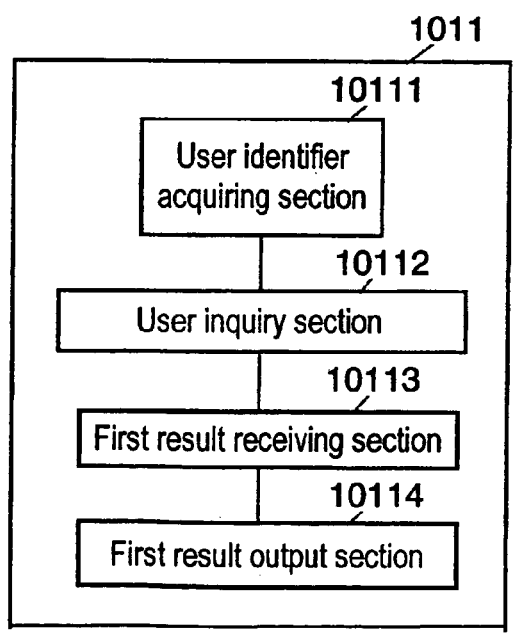
FIG. 14 is a block diagram showing the architecture of a user identification unit according to the fourth exemplary embodiment.

FIG. 14 shows a block diagram representing a structure of the user identification unit 1011. The user identification unit 1011 comprises user identifier acquiring section 10111, user inquiry section 10112, first result receiving section 10113 and first result output section 10114.

User identifier acquiring section 10111 acquires a user identifier. It may be comprised of an IC card reader, and software for retrieving the user identifier from data stored in the IC card and read out by the reader, for example.

User inquiry section 10112 makes an inquiry from server unit 21 as to whether a user identified by the user identifier acquired by user identifier acquiring section 10111 is a registered user. User inquiry section 10112 can be comprised of a communication means such as a modem and driver software. In the fourth exemplary embodiment, it is assumed that the user is not given any service of the reuse process of the secondary batteries unless he is registered.

First result receiving section 10113 receives information representing a response to the inquiry regarding registration of the user. The first result receiving section 10113 can be comprised of a modem and driver software, like the user inquiry section 10112.

First result output section 10114 outputs the result received by the first result receiving section 10113. This output may take any form such as an image produced on a display, though not shown in the figure, voice output, and an output by printing. A secondary battery brought in by a user carries a memory sheet with a user identifier recorded therein, and the user identifier can be used to authenticate the legitimacy of the user. When the user is authenticated as not being legitimate, in this instance, the above output includes a process of rejecting the secondary battery outside of the unit.

Figure 9:
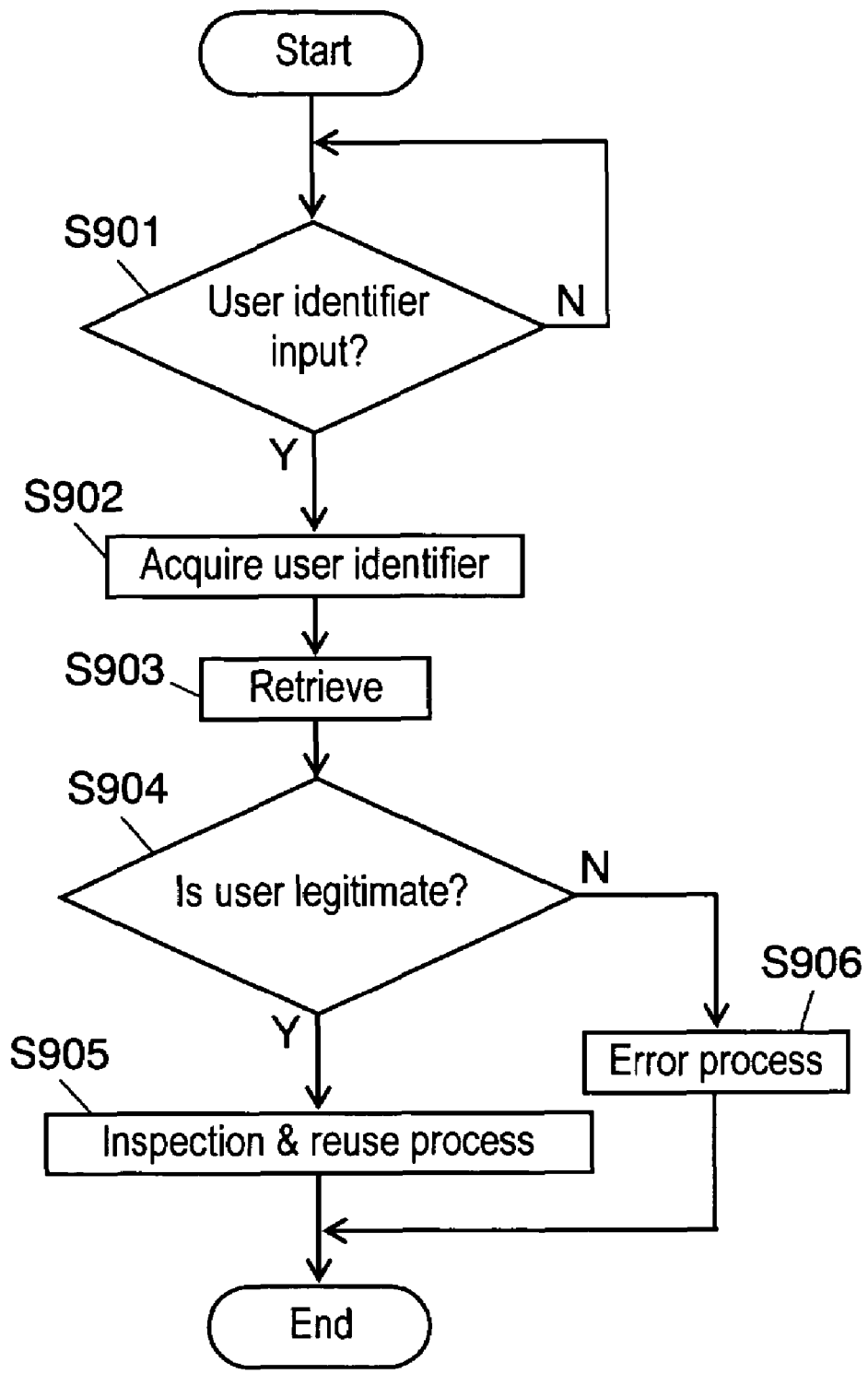
FIG. 9 is a flowchart showing a process of identifying a user according to the second exemplary embodiment.

This operation of user identification unit 1011 has already been described in the second exemplary embodiment with reference to the flow chart in FIG. 9.

Figure 15:
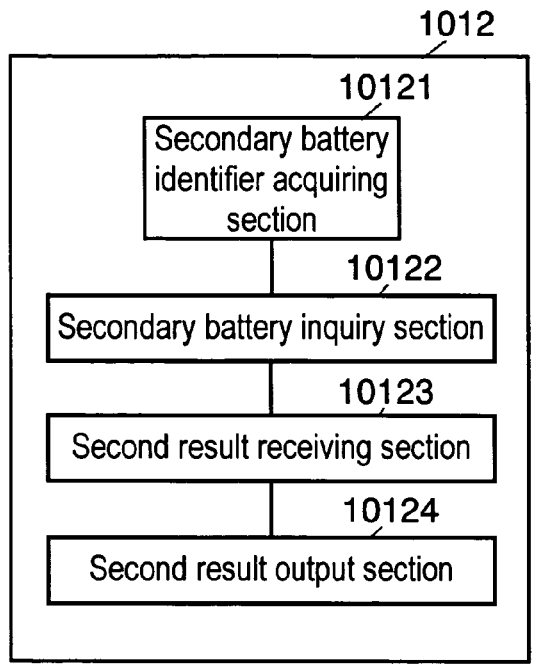
FIG. 15 is a block diagram showing the architecture of a battery identification unit according to the fourth exemplary embodiment.

FIG. 15 shows a block diagram representing a structure of battery identification unit 1012. Battery identification unit 1012 comprises secondary battery identifier acquiring section 10121, secondary battery inquiry section 10122, second result receiving section 10123, and second result output section 10124.

Secondary battery identifier acquiring section 10121 acquires a secondary battery identifier. The acquiring methods include: (1) a method of reading a secondary battery identifier recorded in a memory sheet affixed to a secondary battery, (2) a method of acquiring a secondary battery identifier input from a keyboard or the like, (3) a method of scanning an exterior view of a secondary battery using a scanner and driver software, and acquiring a secondary battery identifier from data on the exterior view, and (4) a method of acquiring a secondary battery identifier by reading a barcode on a secondary battery with a barcode reader.

Secondary battery inquiry section 10122 sends an inquiry to server unit 21 regarding whether a secondary battery identified by a secondary battery identifier acquired by secondary battery identifier acquiring section 10121 is a suitable secondary battery for reuse. The determination as to whether the secondary battery is suitable for reuse may be made simply by confirming that it is registered, or checking a period of time after the secondary battery is manufactured, or a number of times it has been processed for reusing. If the determination is made according to the time period and the number of reuses, information on a variety of processes made to the secondary battery as described below are stored in the server unit or recorded in a memory sheet affixed to the secondary battery as its historical data.

Secondary battery inquiry section 10122 can be comprised of communication means such as a modem and driver software.

Second result receiving section 10123 is also comprised of a modem and driver software, for instance, and it receives information representing a result, or a response to the inquiry regarding the suitability of the secondary battery.

Second result output section 10124 outputs the result received by the second result receiving section 10123. The output can be in a variety of forms, such as those described as the output of the first result output section 10114.

Figure 11:
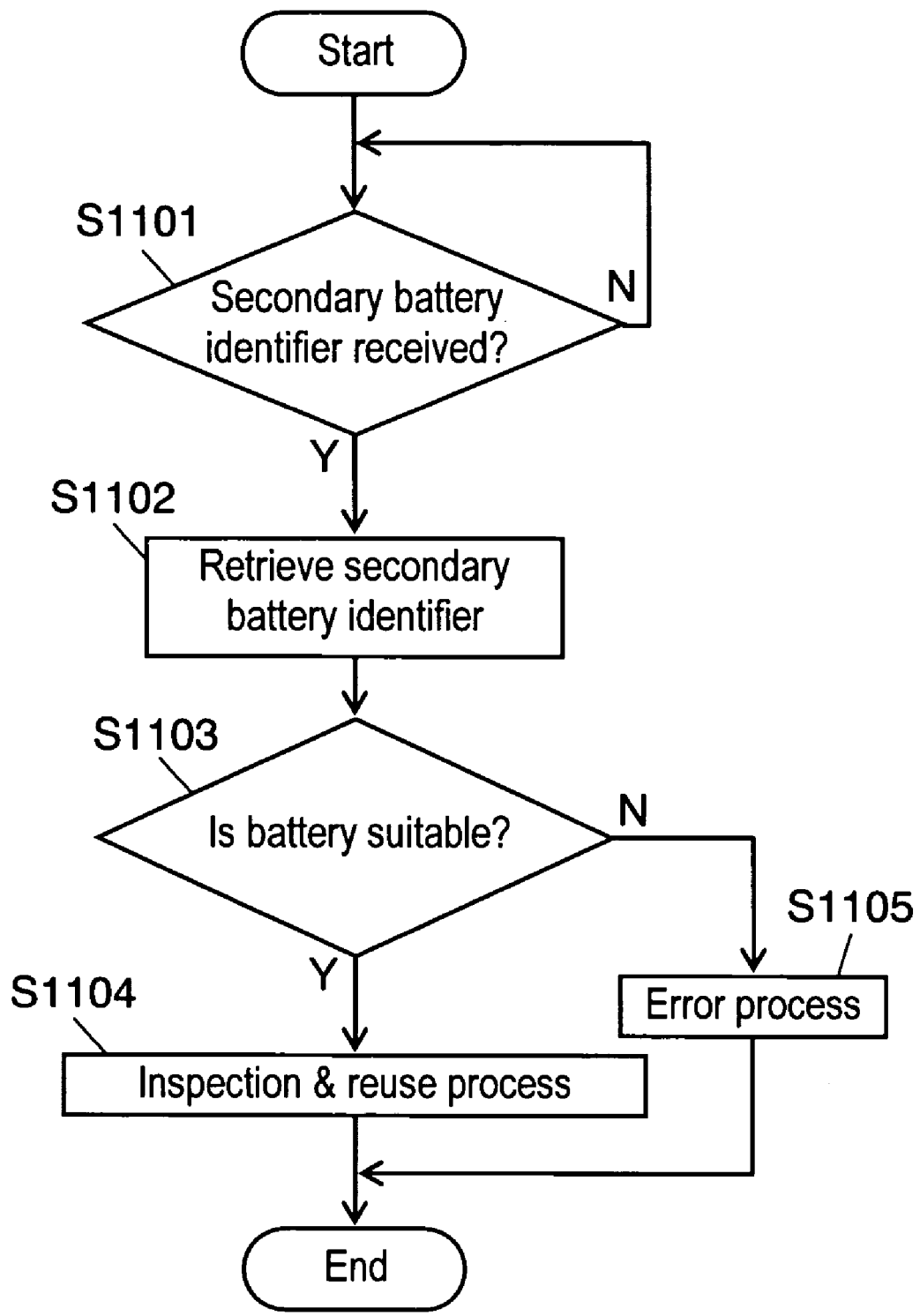
FIG. 11 is a flowchart showing a process of verifying a battery according to the third exemplary embodiment.

Battery identification unit 1012 operates in a manner similar to that already described in the third exemplary embodiment with reference to the flowchart shown in FIG. 11.

Figure 16:
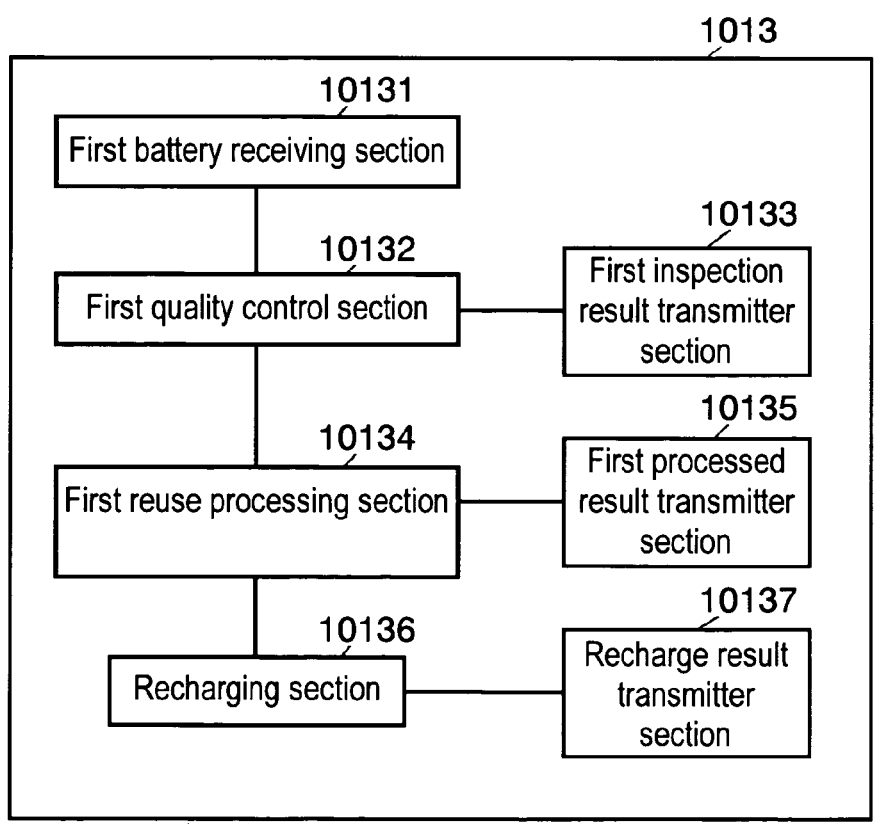
FIG. 16 is a block diagram showing the architecture of a first processing unit according to the fourth exemplary embodiment.

A description will be given next the about first processing unit 1013. FIG. 16 shows a block diagram representing a structure of the first processing unit 1013.

The first processing unit 1013 comprises a first battery receiving section 10131, a first quality control section 10132, a first inspection result transmitter section 10133, a first reuse processing section 10134, a first processed result transmitter section 10135, a recharging section 10136, and a recharge result transmitter section 10137.

The first battery receiving section 10131 receives a secondary battery for first inspection and reuse processing. For instance, the first battery receiving section 10131 receives a secondary battery after the battery is verified suitable for reuse as a result of user identification and battery identification and delivered with a conveyer (not shown), or the like. At the same time, related information on user identifier and secondary battery identifier are forwarded via a bus (not shown) within the unit.

The first quality control section 10132 conducts a first inspection described with respect to FIG. 3 in the first exemplary embodiment, and classifies the secondary battery into appropriate level groups based on a result of the inspection. Details of the first inspection are not repeated here since they were described in the first exemplary embodiment.

The first inspection result transmitter section 10133 transmits to server unit 21 information on the first inspection, which shows the result of the inspection conducted by the first quality control section 10132, in connection with the user identifier and the secondary battery identifier. The first inspection result transmitter section 10133 can be comprised of any means, not only such cable-communication means as a modem and radio-communication means as PHS, but also a broadcasting means such as CATV.

The first reuse processing section 10134 carries out a reuse process of the secondary battery that has been classified into one of a plurality of levels as the result of the first inspection by the first quality control section 10132. Since this reuse process was described in the first exemplary embodiment, it is not repeated here.

The first processed result transmitter section 10135 transmits to server unit 21 the first reuse information, which represents data related to the reuse process carried out in the first reuse processing section 10134, in connection with the user identifier and the secondary battery identifier. The first processed result transmitter section 10135 can also be comprised of any means, not only such cable-communication means as a modem and radio-communication means as PHS, but also broadcasting means such as CATV.

Recharging section 10136 complementally recharges the once reused secondary battery before it is handed over to a user, if a certain time has passed after it went through the reuse process.

Recharge result transmitter section 10137 transmits to server unit 21 the recharge information, which represents data on the recharge process done by recharging section 10136, in connection with the user identifier and the secondary battery identifier. Recharge result transmitter section 10137 can also be comprised of any such means, not only cable-communication means like a modem and radio-communication means such as PHS, but also broadcasting means such as CATV. The recharge information includes such data as a proof to the effect that the recharge was actually made, an amount of recharged electric power, and the like.

Figure 17:
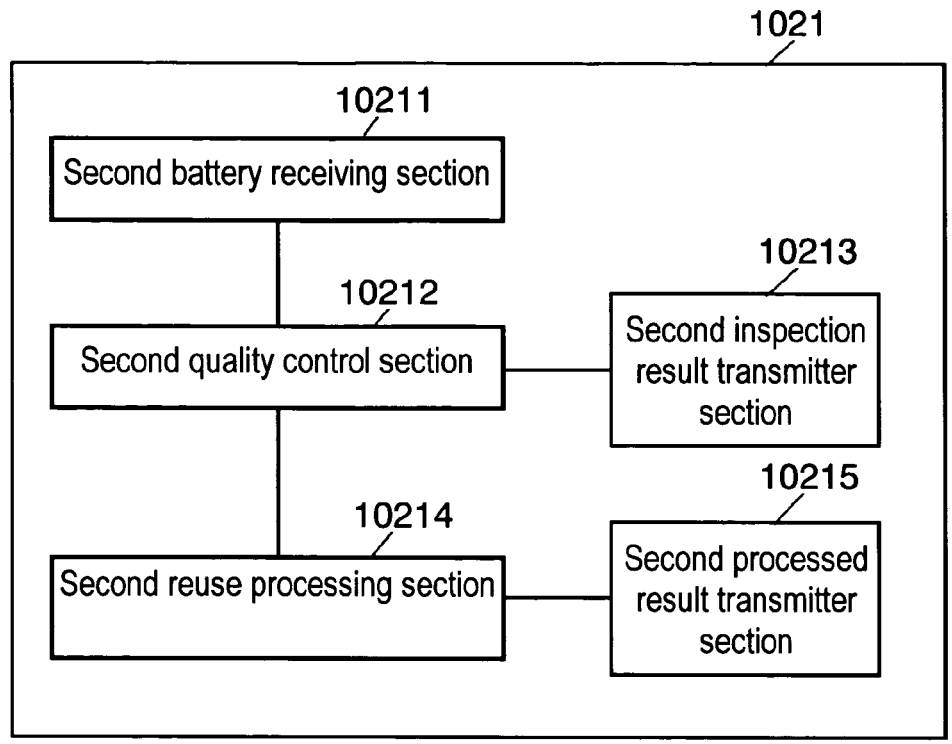
FIG. 17 is a block diagram showing the architecture of a second processing unit according to the fourth exemplary embodiment.

Description is provided next of second processing unit 1021. FIG. 17 shows a block diagram representing a structure of second processing unit 1021.

Second processing unit 1021 comprises a second battery receiving section 10211, a second quality control section 10212, a second inspection result transmitter section 10213, a second reuse processing section 10214, and a second processed result transmitter section 10215.

The second battery receiving section 10211 receives the secondary battery having gone through the process performed by the first processing unit 1012. The secondary battery processed by the first processing unit 1012 is transferred with a conveyer (not shown) or the like, for example. At the same time, related information on user identifier and secondary battery identifier are forwarded via an internal Bus (not shown).

Second quality control section 10212 conducts a second inspection similar to that described in the first exemplary embodiment, and classifies the secondary battery into an appropriate level based on a result of the inspection. Details of the second inspection are not repeated here since they were described with reference to FIG. 3 in the first exemplary embodiment.

Second inspection result transmitter section 10213 transmits to server unit 21 the second inspection information, which shows the result of the inspection conducted by the second quality control section 10212, in connection with the user identifier and the secondary battery identifier. Second inspection result transmitter section 10213 can be comprised of any such means, including not only cable-communication means such as a modem and radio-communication means such as PHS, but also broadcasting means such as CATV.

Second reuse processing section 10214 carries out another reuse process (second reuse process) of the secondary battery that has been classified into one of a plurality of levels as a result of the second inspection by second quality control section 10212. This second reuse process was already described with reference to FIG. 3 in the first exemplary embodiment.

Second processed result transmitter section 10215 transmits to server unit 21 the second reuse information, which represents data related to the reuse process carried out by second reuse processing section 10214, in connection with the user identifier and the secondary battery identifier. The second processed result transmitter section 10215 can also be comprised of any such means, including not only cable-communication means such as a modem and radio-communication means such as PHS, but also broadcasting means such as CATV.

Figure 18:
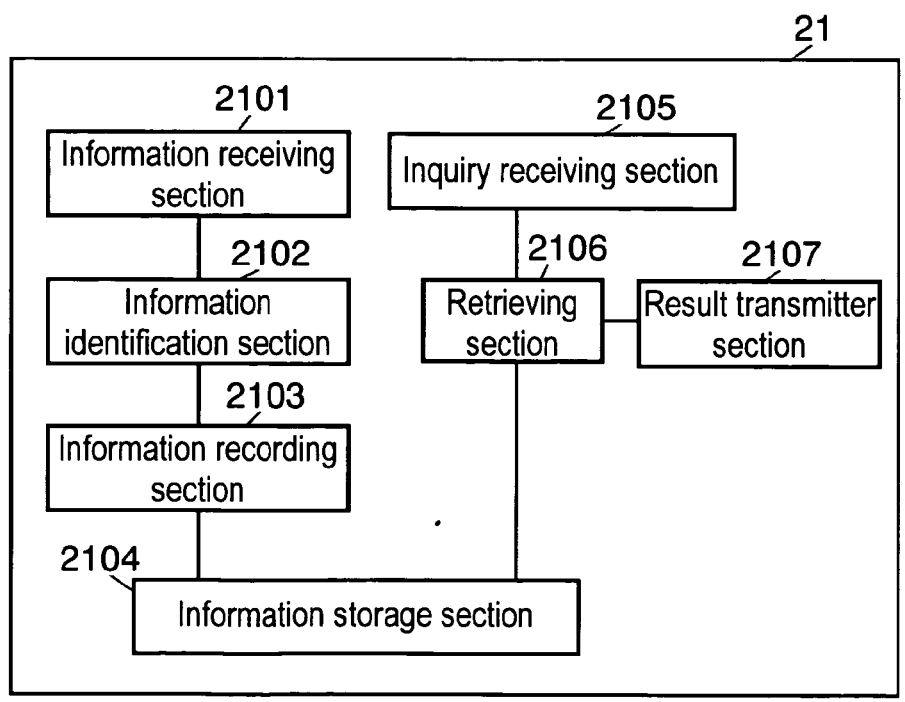
FIG. 18 is a block diagram showing the architecture of a server unit according to the fourth exemplary embodiment.

A description is provided next of server unit 21. FIG. 18 shows a structure of server unit 21.

The server unit 21 comprises an information receiving section 2101, an information identification section 2102, an information recording section 2103, an information storage section 2104, an inquiry receiving section 2105, a retrieving section 2106, and a result transmitter section 2107.

The information receiving section 2101 receives a variety of information from the individual units in the first site 101 and the second site 102. The information receiving section 2101 generally comprises communications means such as a modem, driver software, and the like.

The information identification section 2102 identifies the kind of information received in the information receiving section 2101. The information identification section 2102 comprises software. The software is normally stored in a semiconductor memory. Alternatively, information identification section 2102 may be composed of a custom design electronic circuit.

The information recording section 2103 records the information in an appropriate storage area (i.e. information storage section 2104 described hereinafter) according to the kind of information identified by the information identification section 2102. The information recording section 2103 can be comprised of software.

The information storage section 2104 has information stored therein. The information is that information recorded by information recording section 2103. More specifically, the information includes the information used for managing the users, covering data of secondary batteries (including usage and other historical data of the secondary batteries), and the like. The information storage section 2104 may be comprised of any of a hard disk, rewritable optical disk, and the like medium capable of storing the information.

The inquiry receiving section 2105 receives inquiries from user identification unit 1011 and battery identification unit 1012. The inquiry receiving section 2105 is normally comprised of a modem and driver software.

The retrieving section 2106 retrieves information in response to the inquiry received in inquiry receiving section 2105, and the retrieving section 2106 is normally comprised of software.

The result transmitter section 2107 transmits a retrieved result of the retrieving section 2106, or a response to the inquiry. The result transmitter section 2107 is also generally comprised of a modem and the driver software.

A description of the processes performed on the inquiries from user identification unit 1011 and battery identification unit 1012 will not be repeated here since they were already described using FIG. 14 and FIG. 15 respectively.

Server unit 21 receives information on the inspection and the reuse processes carried out in first processing unit 1013 and second processing unit 1021, and stores them. The above operation of server unit 21 is described next with reference to a flowchart of FIG. 19.

Step S1901: A determination is made as to whether information receiving section 2101 received information. If it received information, the process goes on to step S1902, or the process goes back to a point preceding the step S1901 if not received.

Step S1902: Information identification section 2102 identifies the kind of information received.

Step S1903: Information recording section 2103 records data in a table corresponding to the kind of information received. The table is provided inside information storage section 2104.

The operation is described more concretely as follows.

Figures 19, 20:
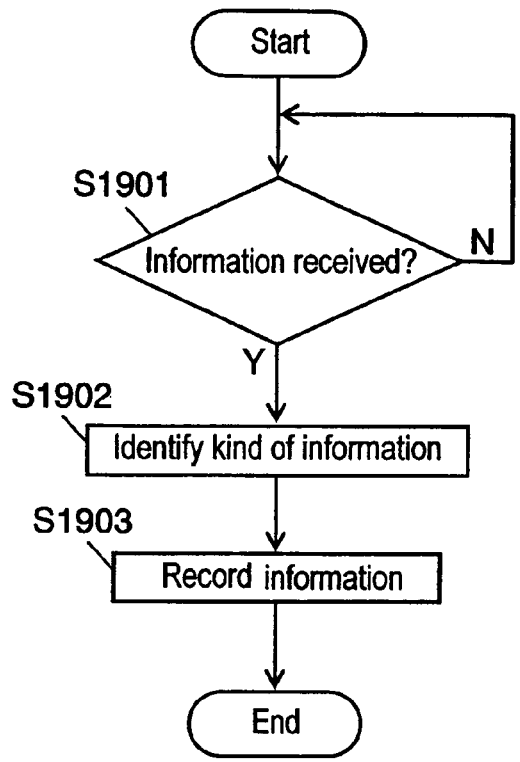
FIG. 19 is a flowchart showing an operating process of the server unit according to the fourth exemplary embodiment.
FIG. 20 is a management table for users according to the fourth exemplary embodiment.

A user management table shown in FIG. 20 is stored in information storage section 2104 within server unit 21. The user management table is a table used to determine whether a user is legitimate or not. The user management table includes data comprising "user identifier", "number of new batteries purchased", "number of reuses", and the like.

"User identifier" is identification information assigned in advance to each user when the user is registered, and it is recorded in the user management table upon registration. In other words, the number of records in the table increases one by one whenever a new user is registered. "Number of new batteries purchased" is the number of new secondary batteries purchased by the user who can be identified by the user identifier. When a user purchases a new battery at the time of registration, for instance, a data of "1" is recorded in the table. It may be possible to keep a record of any user who frequently loses secondary batteries and purchases new butteries, so that he may be offered the new batteries at higher prices when he purchases the new batteries again. This may be a way to deter him from purchasing new batteries, and to promote use of recycled batteries.

"Number of reuses" indicates the number of purchases of reusable batteries. This data provides information about use behaviors of individual users, which can be used for marketing ploy and the like.

Furthermore, a secondary battery management table shown in FIG. 21 is also stored in information storage section 2104 of server unit 21. The secondary battery management table contains a number of kinds of recorded data for secondary batteries beside "secondary battery identifier". The data includes "date of manufacture", "first time user identifier", "number of reuses", "first inspection data", "first reuse data", "second inspection data", "second reuse data", and so on. Data is revised repeatedly in "first inspection data", "first reuse data", "second inspection data", and "second reuse data" for the number of times ("n" times) the reuse processes are executed. These numbers differ from one battery to another as identified by the second battery identifiers.

When a new secondary battery is sold, for instance, the unit located in first site 101 transmits information on the "secondary battery identifier", "date of manufacture", and "first time user identifier" to server unit 21, and these pieces of information are stored in server unit 21. The information of "secondary battery identifier" and "date of manufacture" are obtained, for instance, by reading a barcode or a memory sheet placed on the secondary battery.

A period of time from the manufacturing date to the present can be calculated (acquired) with the "date of manufacture" and clock provided in server unit 21. Server unit 21 can transmit the calculated time period to the unit in the first site 101 when there is an inquiry about it. (In addition, the above time period can be used as a period after the transfer of the battery to the user, although it is not accurate.)

The "first time user identifier" is information which is input when the user authentication is made as described above at the time of his purchasing the secondary battery.

The "number of reuses" is incremented by information recording section 2103, when the server unit receives information to the effect that the first inspection is started, for example. However, the timing of the increment need not be restricted to the time when the information of the first inspection is transmitted, and the "number of reuses" may be incremented at any other timing such as when first reuse data is transmitted, or when both first reuse data and second reuse data are transmitted.

The "first inspection data" needed here is only information that includes a result of inspection in the first quality control process. In particular, the "first inspection data" includes information indicating that a closed-circuit voltage is checked, a value of the closed-circuit voltage, a value of internal resistance, information indicating that an open-circuit voltage is checked, a value of the open-circuit voltage, measurement conditions for the above checks (e.g. 0.3Ω in resistance, 0.5 second in measuring time, temperature during the measurement, etc.), and a classification level. The "first inspection data" further includes information indicating that a visual inspection is performed, and information showing a level resulting from the visual inspection. This information on the visual level also includes information suggesting that the battery is suitable for sale to a user, for example.

The "first reuse data" can be any information that relates to a first reuse process in the first reuse step. In particular, the "first reuse data" is information indicating that the battery is in fact charged. The "first reuse data" includes an amount of charged capacity, ambient condition when the battery is being charged (i.e. temperature, etc.), and the like.

The "second inspection data" can be just information including a result of inspection in the second quality control process. Specifically, the "second inspection data" includes information indicating that a visual inspection is performed, information indicating that charge/discharge capacity is checked, data showing a result of the charge/discharge capacity check, and other similar information as noted in the first inspection data.

The "second reuse data" can also be any information that relates to a second reuse process in the second reuse step. In particular, the "second reuse data" includes information indicating that the exterior is renewed, information showing an illustration pattern of the renewed exterior, information to identify the exterior, information indicating that the battery is in fact charged, an amount of charged capacity, and an ambient condition when the battery is being charged (i.e. temperature, etc.). The "second reuse data" further includes information indicating that the battery has been given a certain period of aging, condition of the aging, and the like.

FIG. 22 shows an example of data configuration of the information transmitted to server unit 21. Information received by server unit 21 includes "user identifier", "secondary battery identifier", "kind of information" and the "information" itself. The "kind of information" is the information covering the data in the secondary battery management table. This information includes "first inspection data", "first reuse data", "second inspection data", and "second reuse data", to be specific. Server unit 21 records the received "information" in a data area corresponding to the "kind of information".

According to this exemplary embodiment as described above, wherein the server unit manages information on the inspection process and the reuse process of the secondary batteries, it can efficiently exclude all the secondary batteries that are not suitable for reuse during the process of recycling, thereby promoting realization of the fairly recycle-oriented society.

Since the server unit manages information on the users, this invention makes possible the user authentication, so as to promote improvement of the reuse rate of secondary batteries. In other words, this invention makes it possible to take measures against certain users who purchase many new batteries instead of using recycled batteries, so that new batteries are offered at higher prices when they purchase the new batteries. These measures provide for the possibility of improving the reuse rate.

In this exemplary embodiment, server unit 21 manages a variety of data for the secondary batteries using the secondary battery management table. However, the variety of data for the secondary battery may be recorded in a rewritable memory sheet placed on the secondary battery. As a concrete example, first processing unit 1013 and second processing unit 1021 may be provided with means of recording into memory sheet 121, so that first inspection data, first reuse data, second inspection data, and second reuse data recorded individually in memory sheet 121 are read and used whenever necessary.

Memory sheet 121 can be used in the following manner.

In the first inspection, first processing unit 1013 reads a transfer date of a secondary battery to a user as recorded in memory sheet 121 of the battery, obtains the present time from its own clock, and classifies the secondary battery into one of a plurality of quality levels according to a period of elapsed time after the transfer as calculated between these times. In particular, all secondary batteries exceeding one year are regarded as low level (i.e., above a predetermined level) that need to be sent to the recycling process (disposed of) without subjecting them to the reuse process.

In the first inspection, first processing unit 1013 also obtains information on the number of times that the secondary battery has undergone the first reuse process and/or the second reuse process, and classifies the secondary battery into one of a plurality of quality levels according to the number. In particular, any of the secondary batteries is considered to be in the low level (i.e., above a predetermined level), if it is reused 500 times or more, so that it is sent to the recycling process (disposed of) without subjecting the batteries to the reuse process.

INDUSTRIAL APPLICABILITY

As described above, the present invention can improve a reuse rate and a recycling rate of secondary batteries while assuring quality of the secondary batteries with the simple method, and thereby the invention can contribute to the recycle-oriented society.

The invention claimed is:

1. A method of recycling secondary batteries, said method comprising:
   a first quality control process performed at a first site, said first quality control process including:
      conducting a first inspection on the secondary batteries;
      separating the secondary batteries into at least two quality levels based on a result of said first inspection; and
      classifying the separated secondary batteries into a first group and a second group according to said separating of the secondary batteries into the at least two quality levels;
   a first reuse process performed on the first group of secondary batteries at the first site, said first reuse process including different ways of processing the first group of secondary batteries to make the first group of secondary batteries reusable according to a quality level of each of the secondary batteries of the first group;
   a second quality control process performed at a second site, said second quality control process including:
      conducting a second inspection on the second group of secondary batteries;
      separating the second group of secondary batteries into at least two quality levels based on a result of said second inspection; and
      classifying the separated second group of secondary batteries into a third group and a fourth group according to said separating of the second group of secondary batteries into the at least two quality levels;
   a second reuse process performed on the third group of secondary batteries at the second site, said second reuse process including different ways of processing the third group of secondary batteries to make the third group of secondary batteries reusable according to a quality level of each of the secondary batteries of the third group; and
   a recycling process performed on the fourth group of secondary batteries at a third site, said recycling process including disassembling the fourth group of secondary batteries to collect useful materials.

2. The method of claim 1, wherein said first reuse process is comparatively simpler than said second reuse process.

3. The method of claim 1, wherein:
   said first inspection includes an open-circuit voltage check to measure an open-circuit voltage of each of the secondary batteries;
   said separating is based on a result of said open-circuit voltage check; and
   said first reuse process further includes charging of the first group of secondary batteries in a prescribed manner.

4. The method of claim 3, wherein said first inspection further includes a closed-circuit voltage check to measure a closed-circuit voltage of each of the secondary batteries, and said separating is further based on a result of said closed-circuit voltage check.

5. The method of claim 1, wherein said first quality control process comprises:
   acquiring at least one of a first time period elapsed after each of the secondary batteries was transferred to a user and a second time period elapsed after each of the secondary batteries was manufactured; and
   separating the secondary batteries based on the at least one of the first acquired time period and the second acquired time period.

6. The method of claim 5, wherein said separating the secondary batteries based on the at least one of the first acquired time period and the second acquired time period comprises:
   separating the secondary batteries into a portion having at least one of the first acquired time period and the second acquired time period at or above a predetermined level; and
   transferring the portion of the secondary batteries to said recycling process without subjecting the portion of the secondary batteries to said first reuse process or said second reuse process.

7. The method of claim 1, wherein said first quality control process comprises:
   acquiring a number of times each of the secondary batteries has undergone at least one of said first reuse process and said second reuse process; and
   separating the secondary batteries based on the acquired number of times.

8. The method of claim 7, wherein said separating of the secondary batteries based on the acquired number of times comprises:
   separating the secondary batteries into a portion having the acquired number of times at or above a predetermined level; and
   transferring the portion of the secondary batteries to said recycling process for disassembling and collecting useful materials without subjecting the portion of the secondary batteries to said first reuse process or said second reuse process.

9. The method of claim 1, wherein said first quality control process comprises:
   obtaining appearance data including information on an external appearance of the secondary batteries; and
   separating the secondary batteries based on the appearance data.

10. The method of claim 1, wherein said second quality control process comprises:
    conducting a charge capacity inspection for checking an electrical charge and discharge capacity of the second group of secondary batteries; and
    classifying the second group of secondary batteries into at least two quality levels based on a result of said charge capacity inspection.

11. The method of claim 10, wherein said second reuse process includes an aging period after said charge capacity inspection.

12. The method of claim 1, wherein said second quality control process comprises:
    obtaining appearance data including information on an external appearance of the second group of secondary batteries; and
    separating the second group of secondary batteries based on the appearance data; and
    wherein said second reuse process comprises renewing the external appearance.

13. The method of claim 1, wherein said second inspection includes:
   an open-circuit voltage check on the second group of secondary batteries; and
   a closed-circuit voltage check on the second group of secondary batteries; and
   wherein said separating the second group of secondary batteries comprises separating the second group of secondary batteries into at least two quality levels based on results of said open-circuit voltage check and said closed-circuit voltage check.

14. The method of claim 1, wherein said second quality control process comprises:
   a short-circuit check for examining a short-circuit and a partial short-circuit potential of each of the second group of secondary batteries; and
   a capacity check for examining if capacity of each of the second group of secondary batteries exceeds a predetermined level; and
   wherein said separating comprises separating the second group of secondary batteries into at least two quality levels based on results of said short-circuit check and said capacity check.

15. The method of claim 1, wherein said first quality control process further includes receiving each of the secondary batteries from a user, said receiving includes:
   a user identifier obtaining process for obtaining a user identifier of the secondary batteries;
   a user authentication process for determining a legitimacy of the user according to the user identifier; and
   advancing the secondary batteries to the first inspection only when the user is authenticated as legitimate based on the user identifier.

16. The method of claim 15, wherein said receiving further includes:
   a battery identifier obtaining process for obtaining a secondary battery identifier of each of the secondary batteries; and
   a battery verification process for determining whether the secondary batteries are suitable for reuse based on the secondary battery identifier; and
   advancing the secondary batteries to the first inspection only when the secondary batteries are verified suitable for reuse based on the secondary battery identifier.

17. The method of claim 15, wherein said first reuse process further includes a wrapping process for wrapping the processed first group of secondary batteries before handing the processed first group of secondary batteries over to the user; and
   said receiving further includes examining a wrapping of the secondary batteries to determine whether the received secondary batteries are in an unused condition.

18. The method of claim 17, wherein said wrapping process comprises covering at least one electrode of each of the processed first group of secondary batteries.

19. The method of claim 1, further comprising:
   an information obtaining process for obtaining at least one of a first inspection data representing a result of said first inspection, a first reuse data relating to said first reuse process, a second inspection data representing a result of said second inspection, and a second reuse data relating to said second reuse process; and
   an information transmission process for transmitting the information obtained in said information obtaining process.

20. The method of claim 1, wherein each of the secondary batteries has a rewritable storage medium; said method further comprising:
   an information obtaining process for obtaining at least one of a first inspection data representing a result of said first inspection, a first reuse data relating to said first reuse process, a second inspection data representing a result of said second inspection, and a second reuse data relating to said second reuse process; and
   an information recording process for storing the information obtained in said information obtaining process in the rewritable storage medium.

21. The method of claim 20, wherein the rewritable storage medium comprises a memory sheet having a display function.

22. The method of claim 1, further comprising a recharging process for supplementary recharging the secondary batteries when the secondary batteries meet a predetermined condition after having undergone at least one of said first reuse process and said second reuse process.

23. The method of claim 1, wherein the secondary batteries comprise nickel metal hydride storage batteries.

24. A system for recycling secondary batteries, said system comprising:
   a first apparatus at a first site, said first apparatus including:
      a battery identification unit for reading a secondary battery identifier and obtaining second battery information from the secondary batteries; and
      a first processing unit for obtaining and transmitting:
         user information;
         the secondary battery information;
         a result of a first inspection conducted on the secondary batteries at said first site, the first inspection including at least one of an open-circuit voltage check for measuring an open-circuit voltage of the secondary batteries and a closed-circuit voltage check for measuring a closed-circuit voltage of the secondary batteries; and
         a result of a first reuse process;
   a second apparatus at a second site, said second apparatus including a second processing unit for obtaining and transmitting:
      a result of a second inspection conducted on a group of the secondary batteries transferred to said second site from said first site including an electrical charge capacity inspection, an open-circuit voltage check, and a closed-circuit voltage check; and
      a result of a second reuse process conducted on at least a portion of the group of secondary batteries transferred to said second site from said first site; and
   a server including:
      an information receiving section for receiving information from said first apparatus and for receiving information from said second apparatus;
      an information identification section for identifying the information received in said information receiving section;
      an information recording section for recording the identified information in a user management table; and
      an information storage section for storing said user management table and a secondary battery management table containing recorded data for the secondary batteries.

25. The system of claim 24, wherein:
said first apparatus further includes an inquiry data acquiring section for receiving an inquiry from a user; and
said server further includes:
  a retrieving section for retrieving data related to the inquiry from the user; and
  a retrieved result transmitter section for transmitting the information retrieved by said retrieving section to said first apparatus.

26. The system of claim 24, wherein said first apparatus is operable to acquire recharge information relating to recharge processing of the secondary batteries before the secondary batteries are handed over to the user, and is operable to transmit the user information and the secondary battery information to said server in connection with the recharge information.

27. The system of claim 24, wherein each of the secondary batteries has a rewritable storage medium, and said first apparatus is operable to acquire the user information and the secondary battery information from said storage medium.

28. The system of claim 24, wherein:
said system is operable to recycle AA-size nickel metal hydride secondary batteries, and
said server is operable to classify the secondary batteries in the first inspection by determining whether:
  the open-circuit voltage is in a range of 1.0V to 1.4V; or
  the closed-circuit voltage is not less than 1.10V when the closed-circuit voltage is measured for a duration of 0.5 second in a circuit of 0.3Ω resistance; and
said server is operable to classify the secondary batteries in the second inspection by determining whether:
  the open-circuit voltage is in a range of 1.3V to 1.4V;
  the closed-circuit voltage is not less than 1.10V when the closed-circuit voltage is measured for a duration of 0.5 second in a circuit of 0.3Ω resistance.

29. The system of claim 28, wherein said server is operable to store a user identifier, a secondary battery identifier, a first processed result, and a second processed result.

30. A method of recycling secondary batteries, said method comprising:
a determination process of verifying that the secondary batteries are suitable for reuse, said determination process includes contacting a server by referring to a secondary battery identifier of each of the secondary batteries;
a first quality control process including:
  conducting a first inspection on the secondary batteries, said first inspection including one of an open-circuit voltage check and a closed-circuit voltage check;
  separating the secondary batteries into at least two quality levels based on a result of said first inspection; and
  classifying the separated secondary batteries into a first group and a second group according to said separating of the secondary batteries into the at least two quality levels, said classifying comprising determining whether the open-circuit voltage is in a predetermined voltage range or whether the closed-circuit voltage is not less than a predetermined voltage;
a first reuse process performed on the first group of secondary batteries, said first reuse process including different ways of processing the first group of secondary batteries to make the first group of secondary batteries reusable according to a quality level of each of the secondary batteries of the first group, said first reuse process including a recharge processing of the first group of secondary batteries;
a second quality control process including:
  conducting a second inspection on the second group of secondary batteries, said second inspection including:
    an electrical charge capacity inspection;
    an open-circuit voltage check; and
    a closed-circuit voltage check;
  separating the second group of secondary batteries into at least two quality levels based on a result of said second inspection; and
  classifying the separated second group of secondary batteries into a third group and a fourth group according to said separating of the second group of secondary batteries into the at least two quality levels, said classifying comprising determining whether the open-circuit voltage is in a predetermined voltage range and whether the closed-circuit voltage is not less than a predetermined voltage;
a second reuse process performed on the third group of secondary batteries, said second reuse process including different ways of processing the third group of secondary batteries to make the third group of secondary batteries reusable according to a quality level of each of the secondary batteries of the third group, said second reuse process including a recharge processing and aging of the third group of secondary batteries.

31. The method of claim 30, wherein:
the secondary batteries are each an AA-size nickel metal hydride battery;
said first inspection includes said open-circuit voltage check of the secondary batteries;
said classifying comprises determining whether the open-circuit voltage is in a range of 1.0V and 1.4V; and
said first reuse process comprises recharging the first group of secondary batteries.

32. The method of claim 30, wherein:
the secondary batteries are each a nickel metal hydride battery;
said first inspection includes said closed-circuit voltage check of the secondary batteries;
said classifying comprises determining whether the closed-circuit voltage is not less than a predetermined voltage in a range of 1.0V to 1.4V; and
said first reuse process comprises recharging the first group of secondary batteries.

* * * * *